(12) United States Patent
Han et al.

(10) Patent No.: US 11,153,588 B2
(45) Date of Patent: *Oct. 19, 2021

(54) DUAL DEBLOCKING FILTER THRESHOLDS

(71) Applicant: GOOGLE LLC, Mountain View, CA (US)

(72) Inventors: Jingning Han, Santa Clara, CA (US); Yaowu Xu, Saratoga, CA (US)

(73) Assignee: GOOGLE LLC, Mountain View, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 16/838,529

(22) Filed: Apr. 2, 2020

(65) Prior Publication Data
US 2020/0236375 A1 Jul. 23, 2020

Related U.S. Application Data

(63) Continuation of application No. 15/706,735, filed on Sep. 17, 2017, now Pat. No. 10,645,408.

(51) Int. Cl.
*H04N 19/85* (2014.01)
*H04N 19/436* (2014.01)
(Continued)

(52) U.S. Cl.
CPC ......... *H04N 19/436* (2014.11); *H04N 19/117* (2014.11); *H04N 19/14* (2014.11);
(Continued)

(58) Field of Classification Search
CPC .... H04N 19/436; H04N 19/117; H04N 19/86; H04N 19/176; H04N 19/157
See application file for complete search history.

(56) References Cited

U.S. PATENT DOCUMENTS 7,027,661 B2 * 4/2006 Estevez ............... H04N 19/117
382/275
7,227,901 B2 6/2007 Joch et al.
(Continued)

FOREIGN PATENT DOCUMENTS

| CN | 106105201 A | 11/2016 |
|----|-------------|---------|
| EP | 2774359 A1  | 9/2014  |

(Continued)

OTHER PUBLICATIONS

Benjamin Bross, WD4: Working Draft 4 of High-Efficiency Video Coding, Jul. 14-22, 2011, ITU-T (Year: 2011).*

(Continued)

*Primary Examiner* — Philip P. Dang
(74) *Attorney, Agent, or Firm* — Young Basile Hanlon & MacFarlane, P.C.

(57) ABSTRACT

An apparatus for video coding using dual deblocking filter thresholds may include a processor generating a reconstructed frame by decoding an encoded bitstream and outputting the reconstructed frame. Decoding may include generating a decoded block by decoding a portion of the encoded bitstream, identifying a first deblocking threshold index from the encoded bitstream, identifying a second deblocking threshold index from the encoded bitstream, generating a reconstructed block based on the decoded block, and including the reconstructed block in the reconstructed frame. Generating the reconstructed block may include deblocking based on the first deblocking threshold index and the second deblocking threshold index.

20 Claims, 16 Drawing Sheets

(51) Int. Cl.

| | |
|---|---|
| *H04N 19/176* | (2014.01) |
| *H04N 19/86* | (2014.01) |
| *H04N 19/117* | (2014.01) |
| *H04N 19/14* | (2014.01) |
| *H04N 19/82* | (2014.01) |
| *H04N 19/157* | (2014.01) |
| *H04N 19/122* | (2014.01) |

(52) U.S. Cl.
CPC ........... *H04N 19/176* (2014.11); *H04N 19/82* (2014.11); *H04N 19/86* (2014.11); *H04N 19/122* (2014.11); *H04N 19/157* (2014.11)

(56) References Cited

U.S. PATENT DOCUMENTS

| | | | | |
|---|---|---|---|---|
| 7,983,505 | B2* | 7/2011 | Subedar | H04N 19/86 382/268 |
| 8,787,443 | B2* | 7/2014 | Sun | H04N 19/80 375/240 |
| 8,908,984 | B2* | 12/2014 | Carmel | H04N 19/60 382/239 |
| 8,971,419 | B2* | 3/2015 | Park | H04N 19/136 375/240.29 |
| 9,185,430 | B2* | 11/2015 | An | H04N 19/159 |
| 9,270,993 | B2* | 2/2016 | Tourapis | H04N 19/86 |
| 9,313,499 | B2* | 4/2016 | Narroschke | H04N 19/86 |
| 9,344,723 | B2* | 5/2016 | Van Der Auwera | H04N 19/172 |
| 9,414,064 | B2 | 8/2016 | Narroschke et al. | |
| 9,591,306 | B2* | 3/2017 | Wedi | H04N 19/105 |
| 9,986,263 | B2* | 5/2018 | Park | H04N 19/196 |
| 10,021,428 | B2* | 7/2018 | Wedi | H04N 19/176 |
| 10,038,915 | B2* | 7/2018 | Joshi | H04N 19/176 |
| 10,291,937 | B2* | 5/2019 | Ikeda | H04N 19/82 |
| 10,326,988 | B2* | 6/2019 | Park | H04N 19/86 |
| 2003/0219074 | A1 | 11/2003 | Park et al. | |
| 2004/0228415 | A1 | 11/2004 | Wang | |
| 2005/0243912 | A1 | 11/2005 | Kwon et al. | |
| 2008/0317377 | A1* | 12/2008 | Saigo | H04N 19/61 382/274 |
| 2012/0093217 | A1 | 4/2012 | Jeon et al. | |
| 2013/0028531 | A1 | 1/2013 | Sato | |
| 2013/0101027 | A1* | 4/2013 | Narroschke | H04N 19/182 375/240.03 |
| 2014/0192862 | A1 | 7/2014 | Flynn et al. | |
| 2015/0264406 | A1 | 9/2015 | Kim et al. | |
| 2018/0091812 | A1* | 3/2018 | Guo | H04N 19/14 |

FOREIGN PATENT DOCUMENTS

| | | |
|---|---|---|
| EP | 2785057 A1 | 10/2014 |
| JP | 2017513326 A | 5/2017 |
| KR | 101373759 B1 | 3/2014 |
| WO | 2013/064547 A1 | 5/2013 |
| WO | 2015138714 A1 | 9/2015 |

OTHER PUBLICATIONS

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet—Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion in PCT/US2018/031565, dated Oct. 8, 2018, 18 pgs.

Geert Van Der Auwera et al., "AHG6: Transform Dependent Deblocking Strength", Joint Collaborative Team on Video Coding (JCT-VC) of ITU-T SG 16 WP 3 and ISO/IEC JTC 1/ISC 29/WG 11, 10th Meeting, Stockholm, SE, Jul. 11-20, 2012, Document JCTVC-J0090_r1, pp. 1-20.

Shuo Lu et al., "AHG6: On deblocking filter parameters", Joint Collaborative Team on Video Coding (JCT-VC) of ITU-T SG 16 WP 3 and ISO/IEC JTC 1/SC 29/WG 11, 10th Meeting: Stockholm, SE, Document JCTVC-J0181, Jul. 11-20, 2012, pp. 1-16.

Benjamin Bross, WD4: Working Draft 4 of High-Efficiency Video Coding, Jul. 14-22, 2011.

\* cited by examiner

DUAL DEBLOCKING FILTER THRESHOLDS

BACKGROUND

Digital video can be used, for example, for remote business meetings via video conferencing, high definition video entertainment, video advertisements, or sharing of user-generated videos. Due to the large amount of data involved in video data, high-performance compression may be advantageous for transmission and storage. Accordingly, it would be advantageous to provide high-resolution video transmitted over communications channels having limited bandwidth, such as video coding using dual deblocking filter thresholds.

SUMMARY

This application relates to encoding and decoding of video stream data for transmission or storage. Disclosed herein are aspects of systems, methods, and apparatuses for encoding and decoding using dual deblocking filter thresholds.

An aspect is an apparatus for video decoding using dual deblocking filter thresholds. Video decoding using dual deblocking filter thresholds may include a processor generating a reconstructed frame by decoding an encoded bitstream and outputting the reconstructed frame. Decoding may include generating a decoded block by decoding a portion of the encoded bitstream, identifying a first deblocking threshold index from the encoded bitstream, identifying a second deblocking threshold index from the encoded bitstream, generating a reconstructed block based on the decoded block, and including the reconstructed block in the reconstructed frame. Generating the reconstructed block may include deblocking based on the first deblocking threshold index and the second deblocking threshold index.

Another aspect is an apparatus for video encoding using dual deblocking filter thresholds. Video encoding using dual deblocking filter thresholds may include a processor generating an encoded frame by encoding an input frame and outputting the output bitstream. Encoding may include generating a decoded frame by decoding the encoded frame, generating a reconstructed frame by reconstructing the decoded frame, and generating an output bitstream including the encoded frame, an indication of the first deblocking threshold index, and an indication of the second deblocking threshold index. Reconstructing the decoded frame may include identifying a joint deblocking threshold index from a plurality of deblocking threshold indexes for deblocking the decoded frame, identifying a first deblocking threshold index from the plurality of deblocking threshold indexes, wherein identifying the first deblocking threshold index includes using the joint deblocking threshold index as a second deblocking threshold index for deblocking the decoded frame, and identifying the second deblocking threshold index from the plurality of deblocking threshold indexes, wherein identifying the second deblocking threshold index includes using the first deblocking threshold index for deblocking the decoded frame.

Another aspect is an apparatus for video encoding using dual deblocking filter thresholds. Video encoding using dual deblocking filter thresholds may include a processor generating a reconstructed frame by generating a decoded frame including decoded blocks by decoding a portion of the encoded bitstream, identifying a first deblocking threshold index from the encoded bitstream, identifying a second deblocking threshold index from the encoded bitstream, the second deblocking threshold index differing from the first deblocking threshold index, generating a partially deblocked frame by deblocking the decoded frame in a first direction based on the first deblocking threshold index, and generating the reconstructed frame by deblocking the partially deblocked frame in a second direction based on the second deblocking threshold index. The method may include and outputting the reconstructed frame.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video compression schemes may include breaking each image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame. The residual information may be further compressed by transforming the residual information into transform coefficients, quantizing the transform coefficients, and entropy coding the quantized transform coefficients.

An encoded bitstream can be decoded to recreate the blocks and the source images from the limited information. A decoded frame may include artifacts, such as blocky artifacts that cross block boundaries caused by quantization. To reduce the artifacts, the decoded frame may be filtered, such as using a deblocking filter, along block boundaries, such as vertical block boundaries and horizontal block boundaries. To retain edge content, such as an object edge, from the input image that aligns with the block boundaries, the filtering may identify threshold values for determining whether to filter a respective block boundary and for identifying corresponding filtering parameters. Filtering both vertical block boundaries and horizontal block boundaries using one set of thresholds may limit the accuracy of the filtering and reduce encoding quality.

Video coding using dual deblocking filter thresholds may improve accuracy and encoding quality by identifying a first optimal set of filter thresholds for filtering in a first direction, such as along vertical block boundaries, and identifying a second optimal set of filter thresholds for filtering in a second direction, such as along horizontal block boundaries. An encoder may identify a deblocking threshold index corresponding to the set of filter thresholds identified for filtering vertical block boundaries and another deblocking threshold index corresponding to the set of filter thresholds identified for filtering horizontal block. The encoder may include information indicating the deblocking threshold indices in an encoded bitstream. A decoder may extract the information indicating the deblocking threshold indices from the encoded bitstream, identify the corresponding filter thresholds, and deblock a decoded frame using the first set of filter thresholds in the first direction and the second set of filter thresholds in the second direction.

Figure 1:
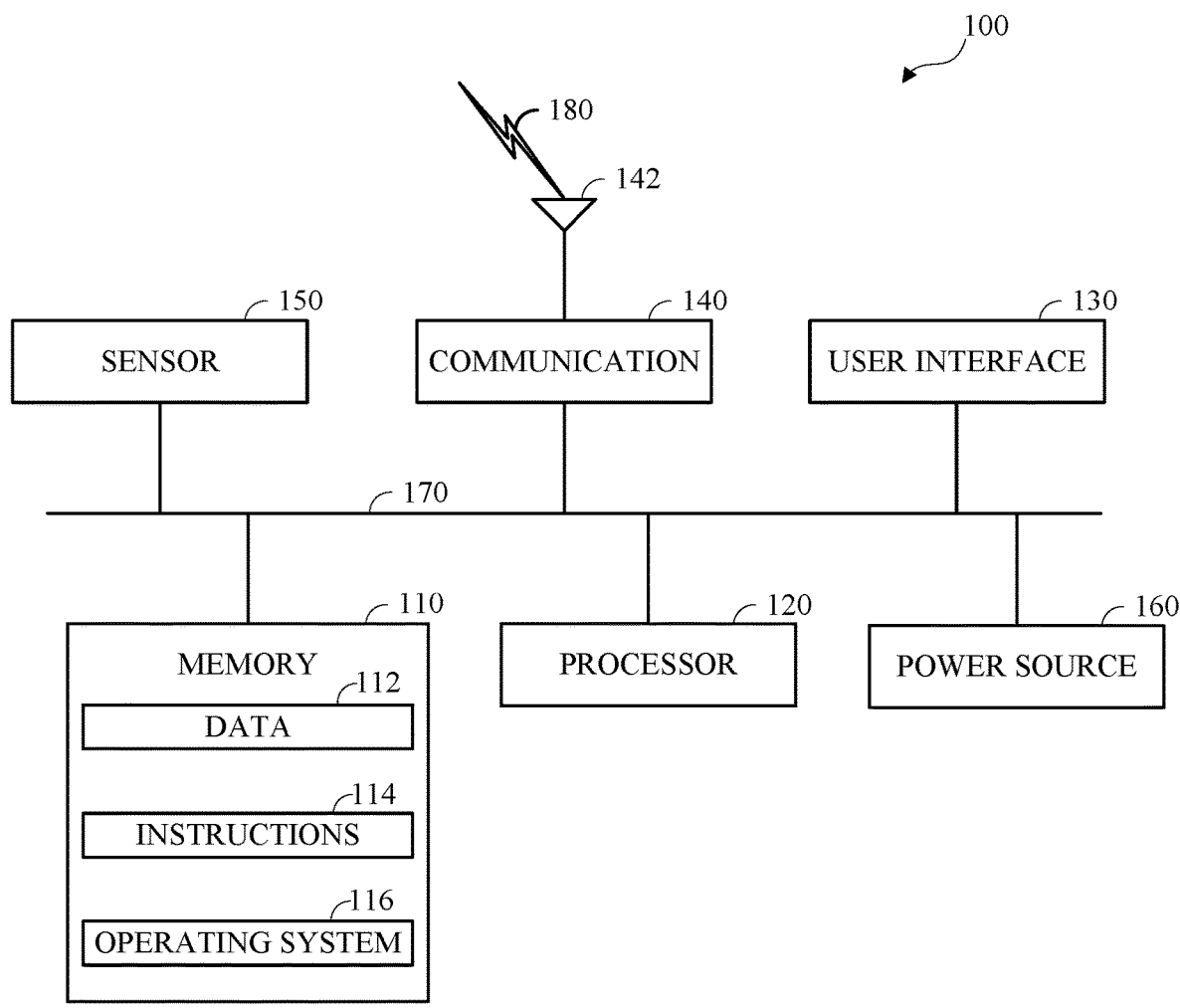
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
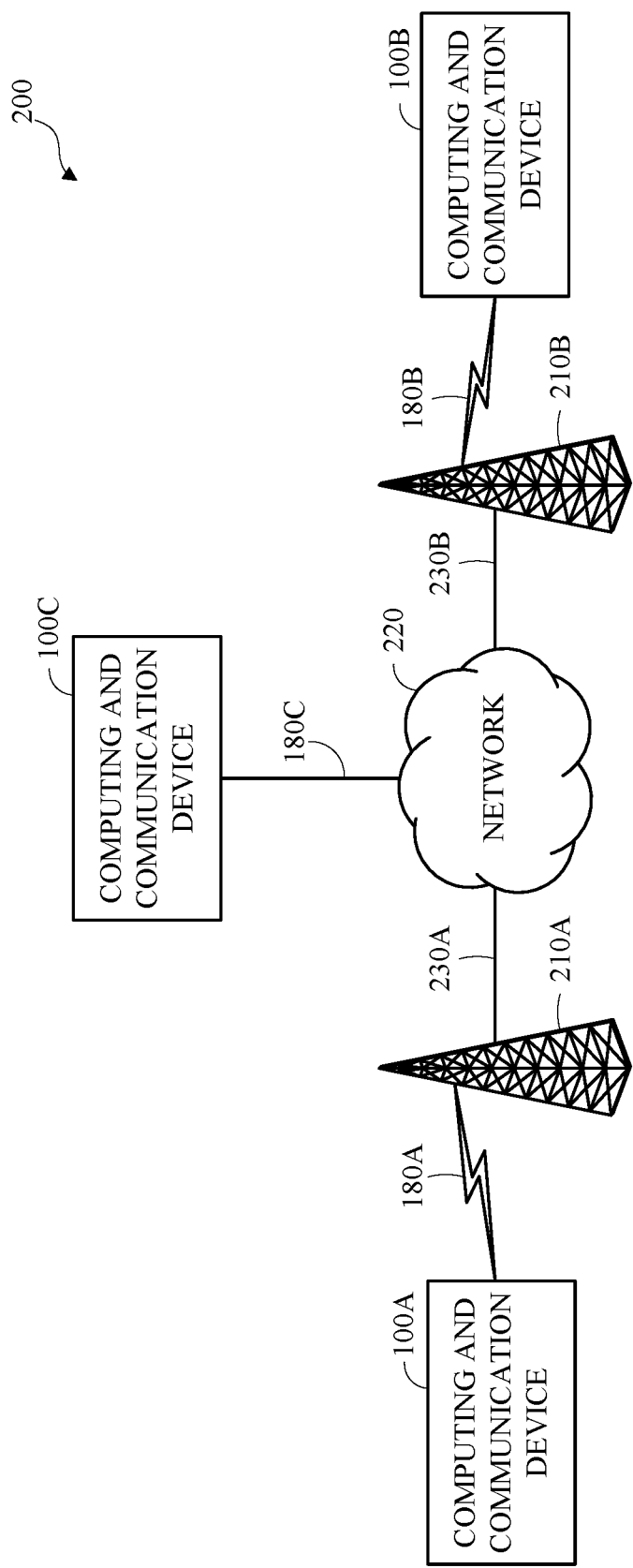
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
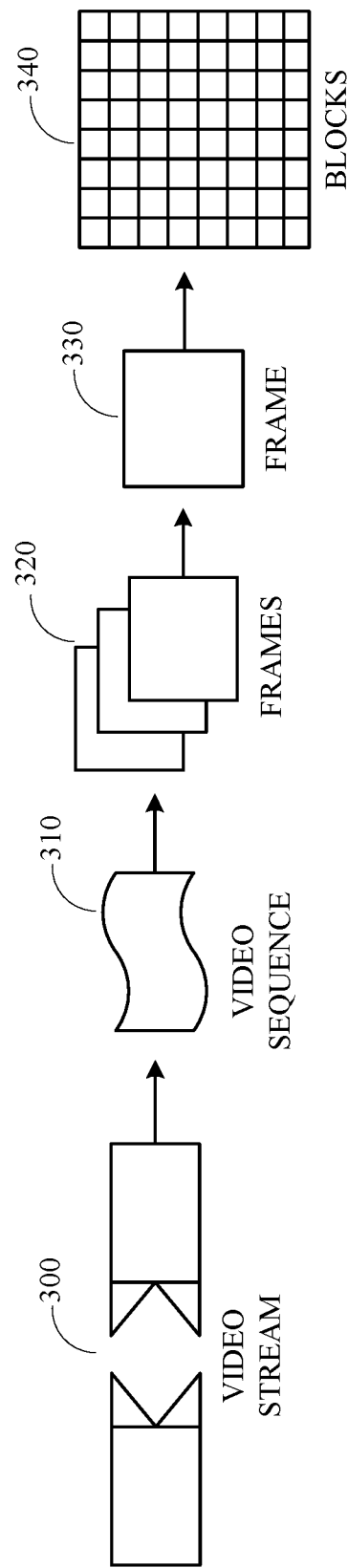
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
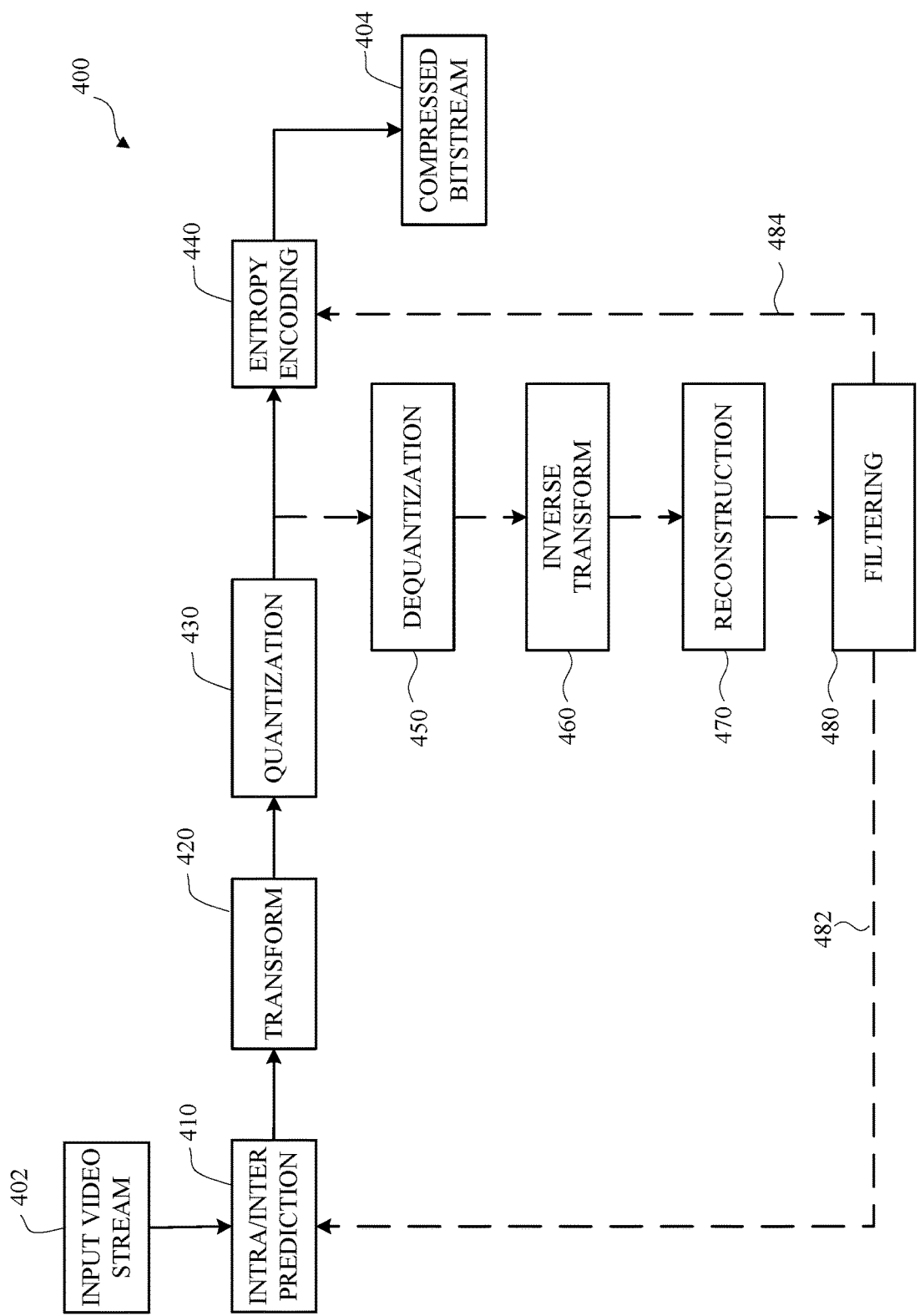
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
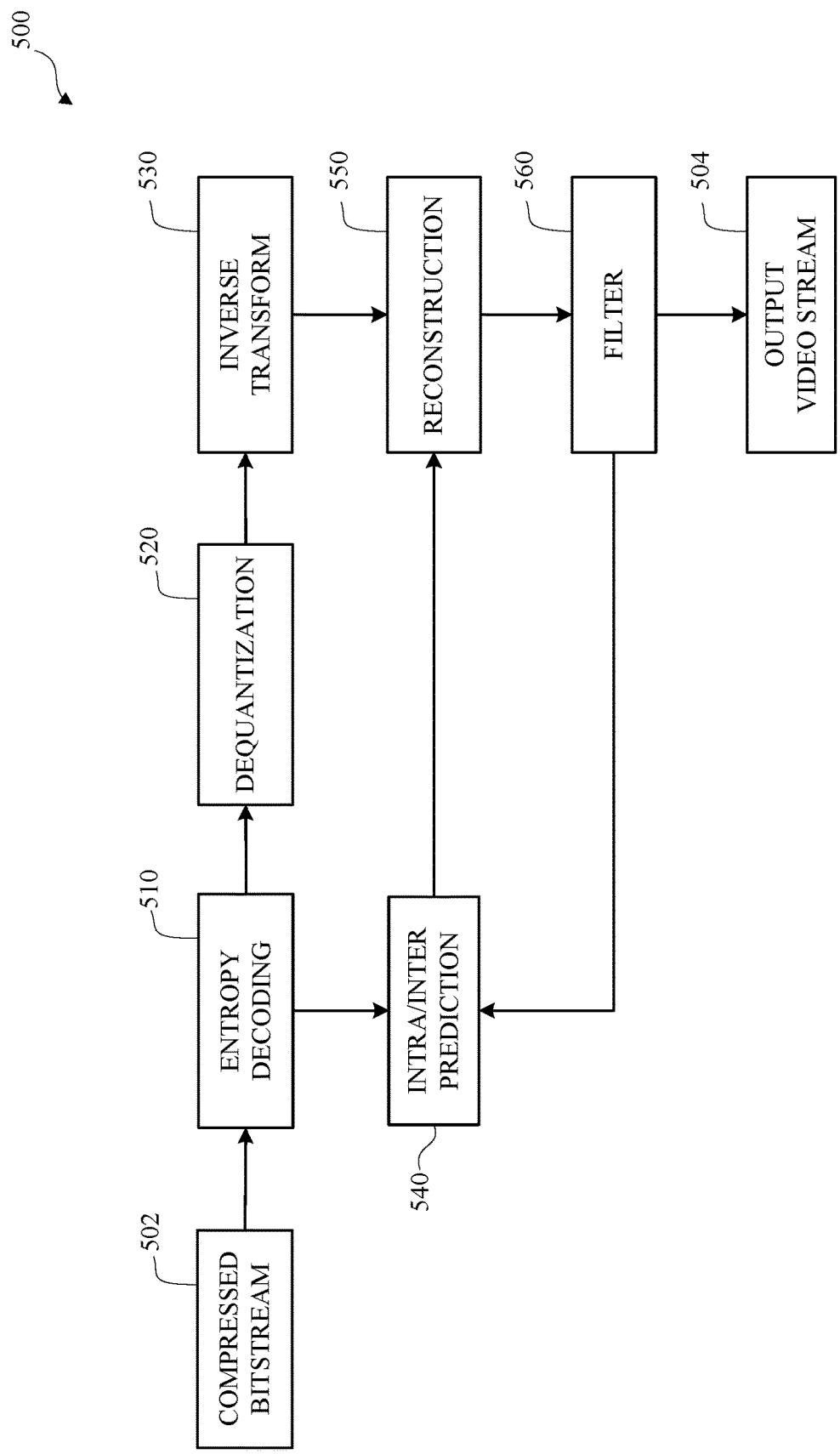
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
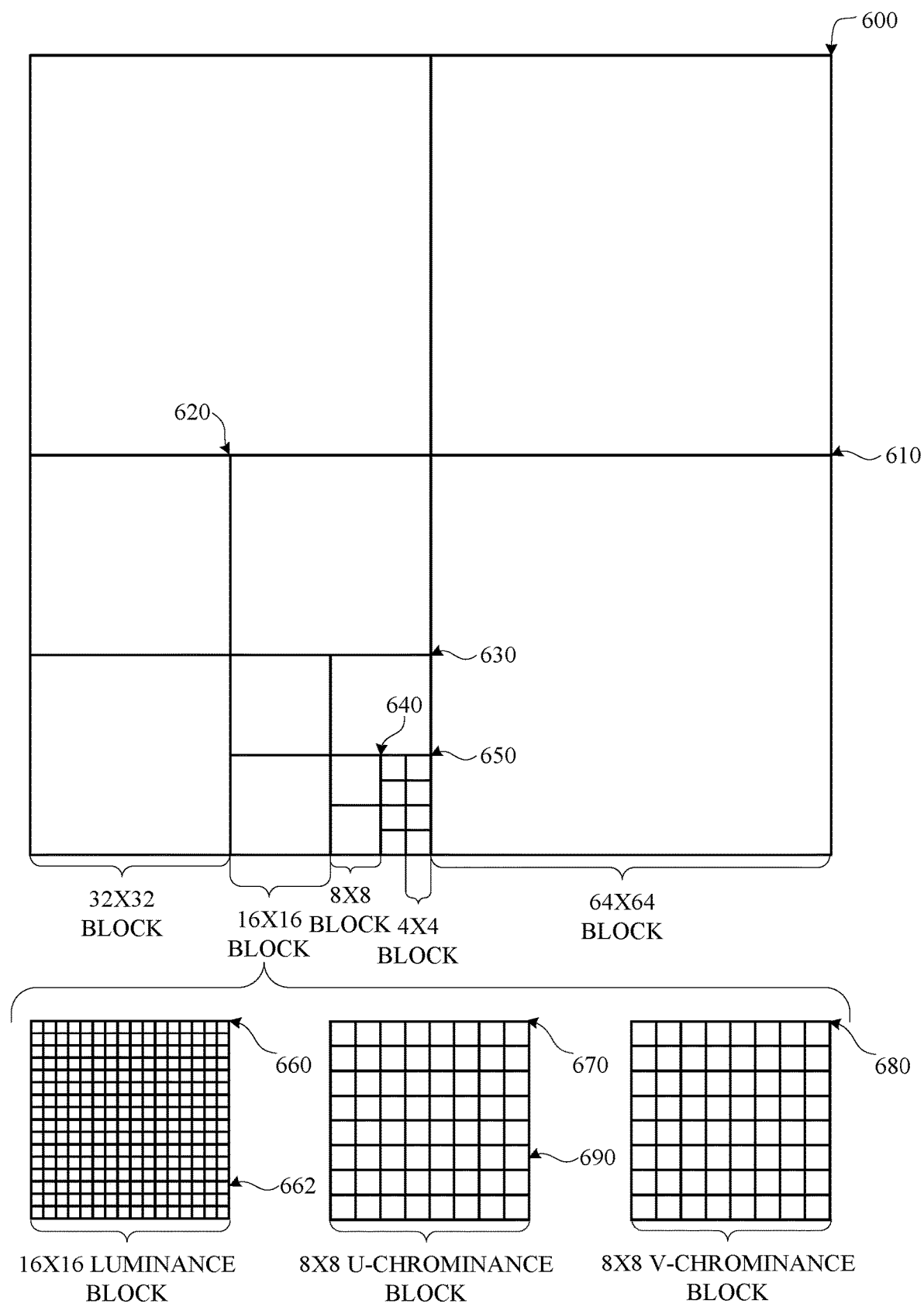
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a predictor to use for encoding a current block or pixel of the current frame with maximal efficiency. For example, the search may identify a portion of the reference frame for which the difference in pixel values between the current block and a prediction block generated based on the portion of the reference frame is minimized, and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a predictor may include calculating a cost function, such as a sum of absolute differences (SAD), between the pixels of portions of the search area and the pixels of the current block.

In some implementations, the spatial difference between the location of the portion of the reference frame for generating a predictor in the reference frame and the current block in the current frame may be represented as a motion vector. The difference in pixel values between the predictor block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
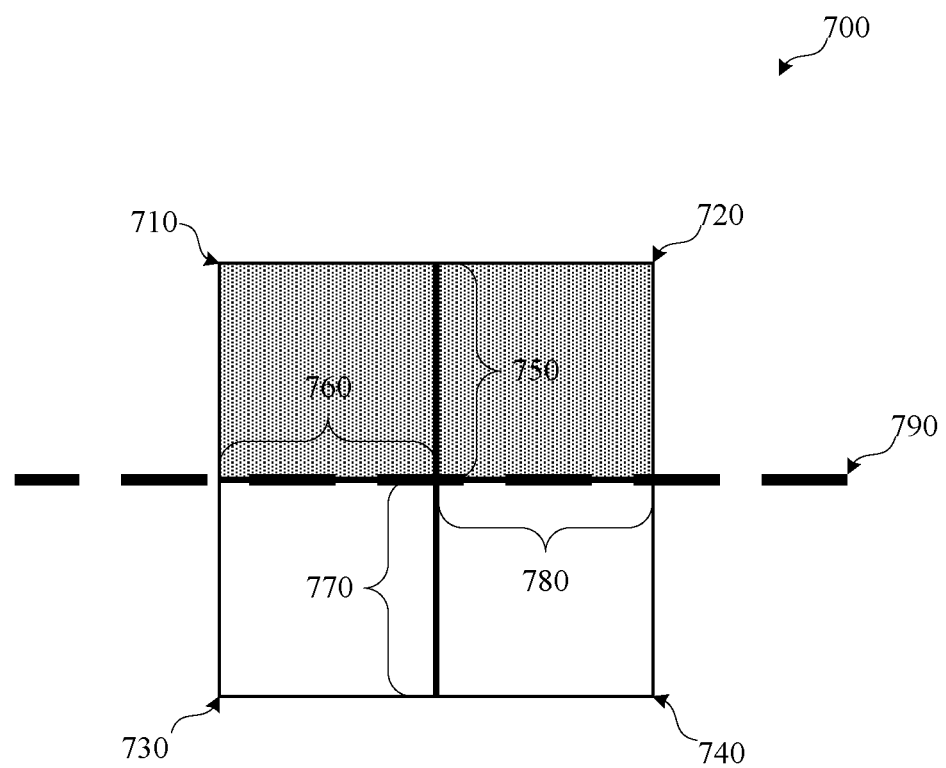
FIG. 7 shows an example of a portion of an input frame including block boundaries in accordance with implementations of this disclosure.

FIG. 7 shows an example of a portion of an input frame including block boundaries in accordance with implementations of this disclosure. The portion 700 of the input frame includes a first block 710 at the top-left, a second block 720 at the top-right, a third block 730 at the bottom-left, and a fourth block 740 at the bottom-right. The portion 700 of the input frame includes a first block boundary 750, which is a vertical block boundary, between the first block 710 and the second block 720, a second block boundary 760, which is a horizontal block boundary, between the first block 710 and the third block 730, a third block boundary 770, which is a vertical block boundary, between the third block 730 and the fourth block 740, and a fourth block boundary 780, which is a horizontal block boundary, between the second block 720 and the fourth block 740.

The first block 710 and the second block 720 are shown with a stippled background to indicate that the first block 710 and the second block 720 include content corresponding to a first object, or visual element, captured by the frame. The third block 730 and the fourth block 740 are shown with a white background to indicate that the third block 730 and the fourth block 740 include content corresponding to a second object, or visual element, captured by the frame. The edge between the first object and the second object captured by the frame corresponds with the second block boundary 760 and the fourth block boundary 780 and is indicated by the thick broken line at 790.

Although not shown expressly in FIG. 7, each block 710, 720, 730, 740 may include pixels. For example, each block 710, 720, 730, 740 may be an 8×8 pixel block.

Encoding an image or video, such as the encoding described in relation to FIG. 4, may introduce artifacts or distortion, such as blocky artifacts, which may be distortion along block boundaries caused by quantization. For example, encoding the portion 700 of the input frame shown in FIG. 7 may introduce blocky artifacts as shown in the reconstructed image portion shown in FIG. 8.

Figure 8:
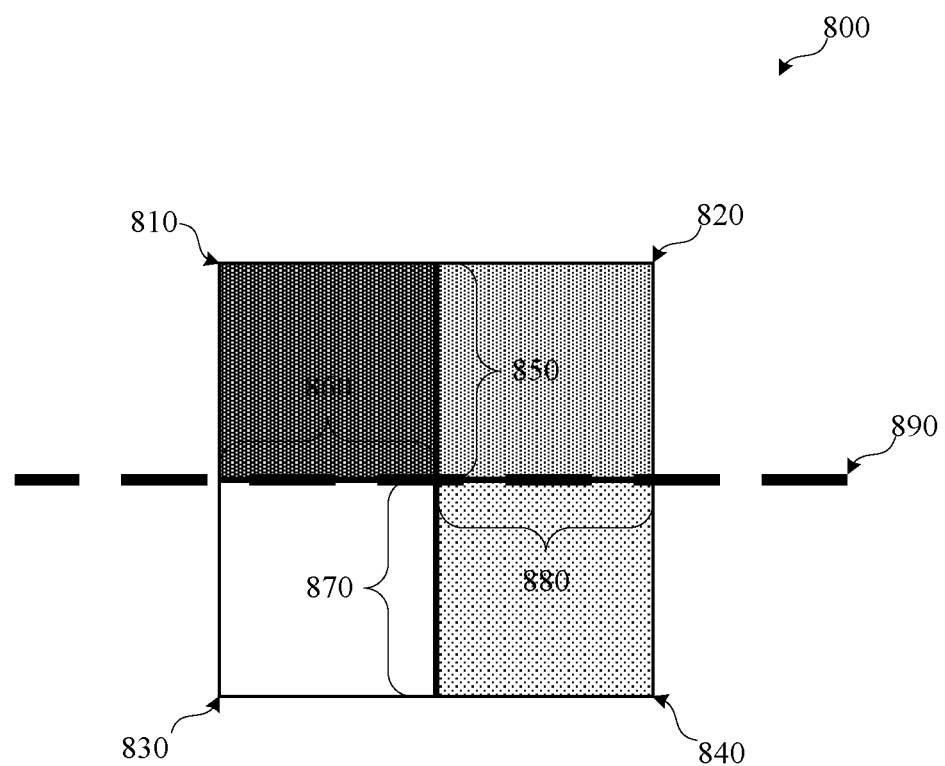
FIG. 8 shows an example of a portion of a reconstructed frame including block artifacts in accordance with implementations of this disclosure.

FIG. 8 shows an example of a portion of a reconstructed frame including block artifacts in accordance with implementations of this disclosure. The portion 800 of the reconstructed frame shown in FIG. 8 may correspond to the portion 700 of the input frame shown in FIG. 7, except that the portion 800 of the reconstructed frame shown in FIG. 8 includes blocky artifacts.

FIG. 8 includes a first block 810 at the top-left, a second block 820 at the top-right, a third block 830 at the bottom-left, a fourth block 840 at the bottom-right, a first block boundary 850, which is a vertical block boundary, between the first block 810 and the second block 820, a second block boundary 860, which is a horizontal block boundary, between the first block 810 and the third block 830, a third block boundary 870, which is a vertical block boundary, between the third block 830 and the fourth block 840, and a fourth block boundary 880, which is a horizontal block boundary, between the second block 820 and the fourth block 840.

The first block 810 shown in FIG. 8 corresponds to the first block 710 shown in FIG. 7, except that the first block 810 shown in FIG. 8 is shown using dark stippling to indicate blocky quantization error. The second block 820 shown in FIG. 8 corresponds to the second block 720 shown in FIG. 7. The third block 830 shown in FIG. 8 corresponds to the third block 730 shown in FIG. 7. The fourth block 840 shown in FIG. 8 corresponds to the fourth block 740 shown in FIG. 7, except that the fourth block 840 shown in FIG. 8 is shown using light stippling to indicate blocky quantization error.

Similar to the objects described in relation to FIG. 7, the first block 810 and the second block 820 shown in FIG. 8 include content corresponding to a first object, or visual element, captured by the frame, and the third block 830 and the fourth block 840 shown in FIG. 8 include content corresponding to a second object, or visual element, captured by the frame. The edge between the first object and the second object captured by the frame corresponds with the second block boundary 860 and the fourth block boundary 880 and is indicated by the thick broken line at 890.

Although not shown expressly in FIG. 8, each block 810, 820, 830, 840 may include pixels. For example, each block 810, 820, 830, 840 may be an 8×8 pixel block.

Deblocking the portion 800 of the reconstructed frame shown in FIG. 8 may include smoothing, or otherwise minimizing, blocky artifacts along block boundaries, such as the blocky artifacts along the first block boundary 850 and the blocky artifacts along the third block boundary 870, and preserving, or minimally blurring, the object edge 890 along the second block boundary 860 and the fourth block boundary 880, which may include distinguishing differences between block corresponding to blocky artifacts from differences between blocks corresponding to object edges.

Figure 9:
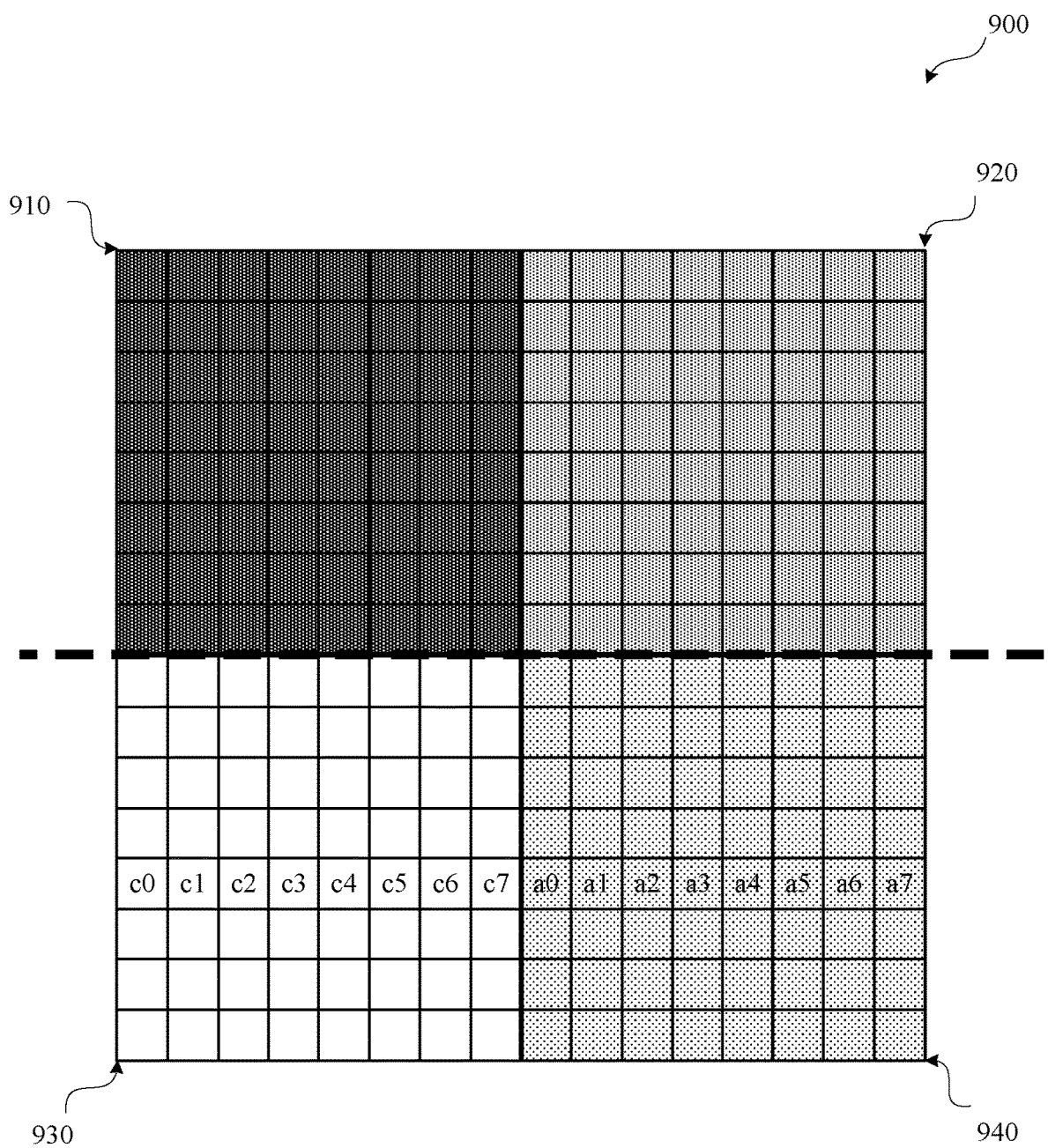
FIG. 9 shows an example of a portion of a reconstructed frame including block artifacts with pixel granularity for a row of pixels in accordance with implementations of this disclosure.

FIG. 9 shows an example of a portion of a reconstructed frame including block artifacts with pixel granularity for a row of pixels in accordance with implementations of this disclosure. The portion 900 of the reconstructed frame shown in FIG. 9 may correspond to the portion 800 of the reconstructed frame shown in FIG. 8, except that in the portion 900 of the reconstructed frame shown in FIG. 9 pixels, or pixel locations, for a row of pixels are expressly represented, and references to the block boundaries are omitted for clarity.

FIG. 9 includes a first block 910 at the top-left, which corresponds to the first block 810 shown in FIG. 8, a second block 920 at the top-right, which corresponds to the second block 820 shown in FIG. 8, a third block 930 at the bottom-left, which corresponds to the third block 830 shown in FIG. 8, and a fourth block 940 at the bottom-right, which corresponds to the fourth block 840 shown in FIG. 8.

The third block 930, which may be a current block, may include pixels, such as pixels along a row horizontally across the third block 930, which are labeled in FIG. 9, from left to right, $c_0$, $c_1$, $c_2$, $c_3$, $c_4$, $c_5$, $c_6$, and $c_7$ for clarity. The fourth block 940, which may be an adjacent block, such as a horizontally adjacent block, may include pixels, such as pixels along the row horizontally across the fourth block 940, which are labeled in FIG. 9, from left to right, $a_0$, $a_1$, $a_2$, $a_3$, $a_4$, $a_5$, $a_6$, and $a_7$ for clarity.

Deblocking the third block 930 may include deblocking one or more of the pixels $c_0$, $c_1$, $c_2$, $c_3$, $c_4$, $c_5$, $c_6$, $c_7$ of a row of the current block (third block 930) along a block boundary between the current block (third block 930) and the horizontally adjacent block (fourth block 940), which may correspond with the fourth block boundary 880 shown in FIG. 8, based on one or more of the pixels c0, c1, c2, c3, c4, c5, c6, c7 along the row from the current block (third block 930) and the pixels a0, a1, a2, a3, a4, a5, a6, a7 along the row from the adjacent block (fourth block 940).

Deblocking the second block 1020 may include deblocking one or more of the pixels c0, c1, c2, c3, c4, c5, c6, c7 of a column of the current block (second block 1020) along a block boundary between the current block (second block 1020) and the vertically adjacent block (fourth block 1040), which may correspond with the third block boundary 870 shown in FIG. 8, based on one or more of the pixels c0, c1, c2, c3, c4, c5, c6, c7 along the column from the current block (second block 1020) and the pixels a0, a1, a2, a3, a4, a5, a6, a7 along the column from the vertically adjacent block (fourth block 1040).

Figure 10:
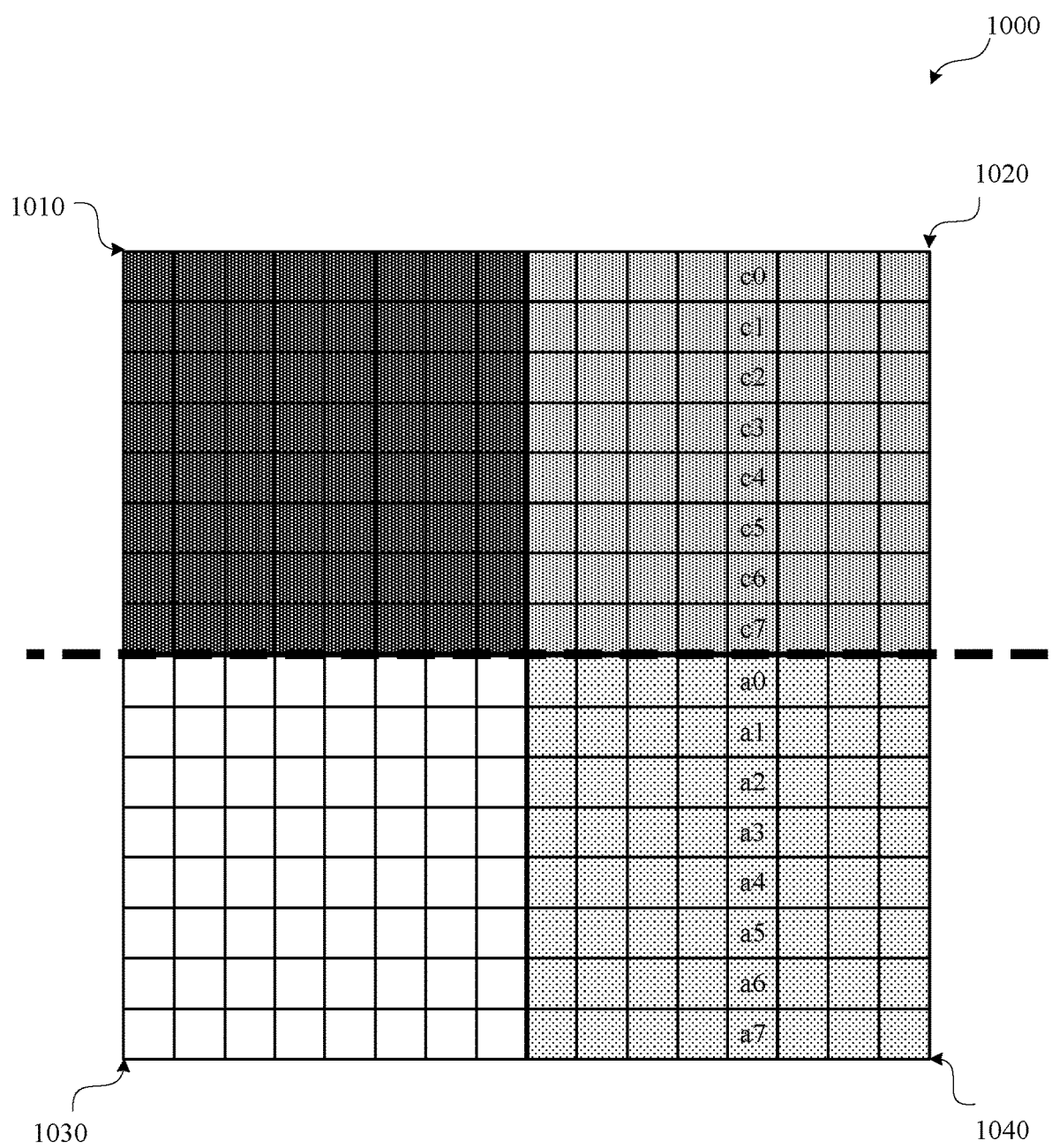
FIG. 10 shows an example of a portion of a reconstructed frame including block artifacts with pixel granularity for a column of pixels in accordance with implementations of this disclosure.

FIG. 10 shows an example of a portion of a reconstructed frame including block artifacts with pixel granularity for a column of pixels in accordance with implementations of this disclosure. The portion 1000 of the reconstructed frame shown in FIG. 10 may correspond to the portion 800 of the reconstructed frame shown in FIG. 8, except that in the portion 1000 of the reconstructed frame shown in FIG. 10 pixels, or pixel locations, for a column of pixels are expressly represented, and references to the block boundaries are omitted for clarity.

FIG. 10 includes a first block 1010 at the top-left, which corresponds to the first block 810 shown in FIG. 8, a second block 1020 at the top-right, which corresponds to the second block 820 shown in FIG. 8, a third block 1030 at the bottom-left, which corresponds to the third block 830 shown in FIG. 8, and a fourth block 1040 at the bottom-right, which corresponds to the fourth block 840 shown in FIG. 8.

The second block 1020, which may be a current block, may include pixels, such as pixels along a column vertically across the second block 1020, which are labeled in FIG. 10, from top to bottom, c0, c1, c2, c3, c4, c5, c6, and c7 for clarity. The fourth block 1040, which may be an adjacent block, such as a vertically adjacent block, may include pixels, such as pixels along the column vertically across the fourth block 1040, which are labeled in FIG. 10, from top to bottom, a0, a1, a2, a3, a4, a5, a6, and a7 for clarity.

Deblocking the second block 1020 may include deblocking one or more of the pixels c0, c1, c2, c3, c4, c5, c6, c7 of a column of the current block (second block 1020) along a block boundary between the current block (second block 1020) and the vertically adjacent block (fourth block 1040), which may correspond with the third block boundary 870 shown in FIG. 8, based on one or more of the pixels c0, c1, c2, c3, c4, c5, c6, c7 along the column from the current block (second block 1020) and the pixels a0, a1, a2, a3, a4, a5, a6, a7 along the column from the vertically adjacent block (fourth block 1040).

Figure 11:
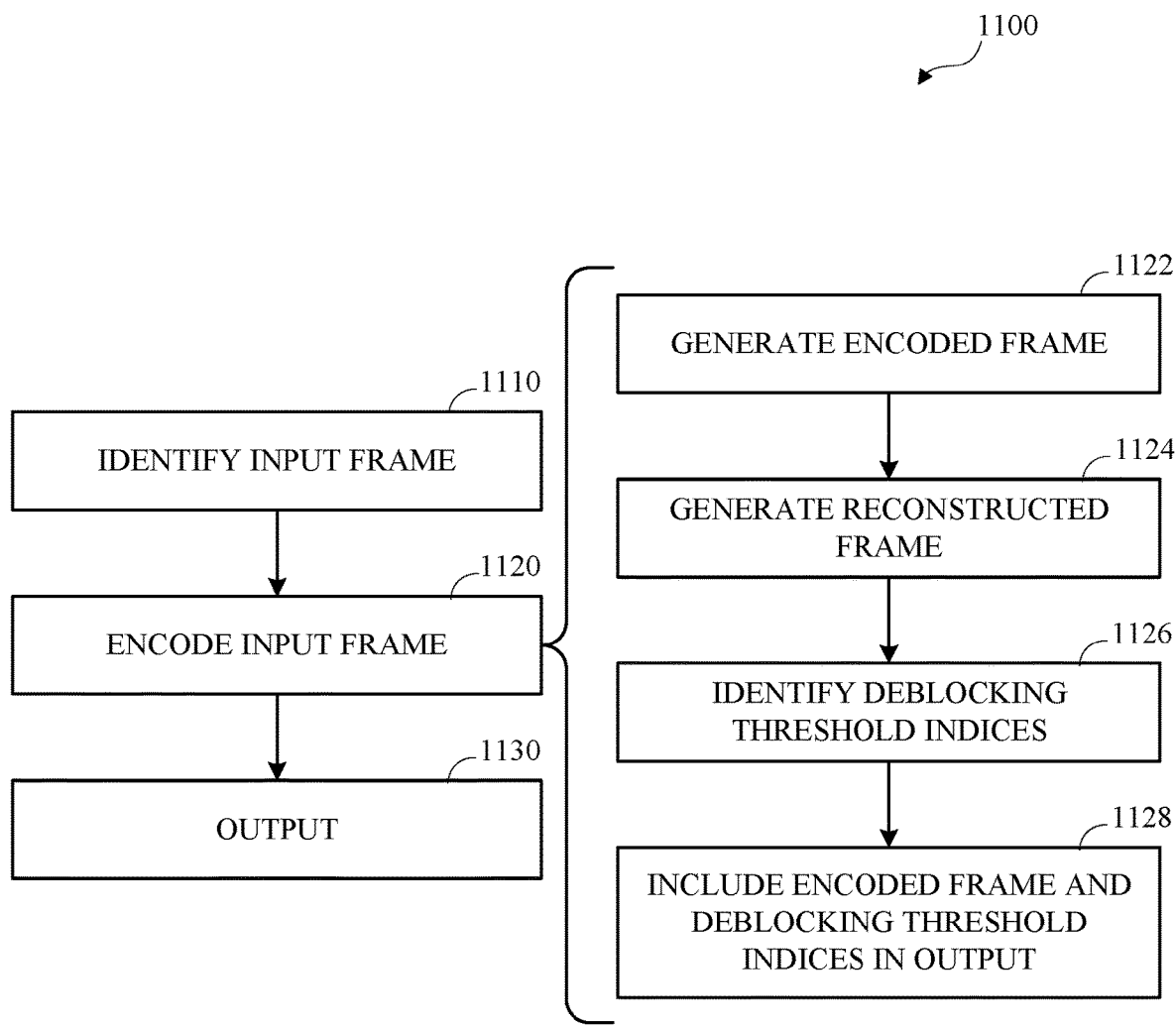
FIG. 11 is a flowchart diagram of an example of encoding using dual deblocking filter thresholds in accordance with implementations of this disclosure.

FIG. 11 is a flowchart diagram of an example of encoding using dual deblocking filter thresholds 1100 in accordance with implementations of this disclosure. Encoding using dual deblocking filter thresholds 1100 may be implemented in an encoder, such as the encoder 400 shown in FIG. 4. For example, the filtering unit 480 of the encoder 400 shown in FIG. 4 may implement encoding using dual deblocking filter thresholds 1100.

Encoding using dual deblocking filter thresholds 1100 may include identifying an input frame at 1110, encoding the input frame at 1120, outputting an encoded bitstream at 1130, or any combination thereof.

An input frame may be identified at 1110. For example, the encoder may receive, or otherwise access, an input image or input video stream or signal, or a portion thereof, and may identify the input image or a portion of the input video stream as the current input frame.

The input frame identified at 1110 may be encoded at 1120. Encoding the input frame at 1120 may include generating an encoded frame at 1122, generating a reconstructed frame at 1124, identifying deblocking threshold indices at 1126, including the encoded frame and the deblocking threshold indices in an output bitstream at 1128, or a combination thereof. Although shown separately in FIG. 11, generating the encoded frame at 1122, generating the reconstructed frame at 1124, identifying deblocking threshold indices at 1126, and including the encoded frame and the deblocking threshold indices in an output bitstream at 1128 may be implemented in combination.

Generating the encoded frame at 1122, which may include using block based encoding, may be similar to the encoding described in relation to FIG. 4, except as described herein or otherwise clear from context. For example, the encoder may generate prediction blocks, identify a difference between respective prediction blocks and corresponding input blocks as residuals, identify respective transform coefficients by transforming the residuals, generate respective quantized transform coefficients by quantizing the transform coefficients, entropy code the respective quantized transform coefficients and other encoding data, such as motion information, or a combination thereof.

Generating the reconstructed frame at 1124 may be similar to the reconstruction described in relation to FIG. 4, except as described herein or otherwise clear from context. For example, the encoder may dequantize the quantized transform coefficients to generate respective dequantized transform coefficients, inverse transform the dequantized transform coefficients to generate respective reconstructed residuals, identify respective prediction blocks, such as the prediction blocks generated at 1122, generate a decoded frame, which may include generating respective decoded blocks of the decoded frame by combining the respective prediction blocks and the corresponding reconstructed residuals, filtering, such as loop filtering, deblocking filtering, or both, the decoded frame to reduce artifacts and to generate the reconstructed frame, or a combination thereof. Although described in relation to generating the reconstructed frame at 1124, deblocking, or a portion thereof, may be performed subsequent to generating the decoded frame or subsequent to loop filtering. The reconstructed frame may be stored or otherwise made accessible as a reconstructed, or reference frame, for encoding another frame.

Deblocking threshold indices may be identified at 1126. In some implementations, identifying the deblocking threshold indices at 1126 may be performed subsequent to generating the encoded frame at 1122, concurrent with, such as in combination with, generating the reconstructed frame at 1124, or subsequent to generating the reconstructed frame at 1124. For example, although generating the reconstructed frame at 1124 and identifying deblocking threshold indices at 1126 are shown separately in FIG. 11, the deblocking described in relation to generating the reconstructed frame at 1124 may include identifying the deblocking threshold indices.

Identifying the deblocking threshold indices at 1126 may include identifying a first deblocking threshold index, identifying a second deblocking threshold index, or both. A deblocking threshold index may be an index, such as an integer value, that identifies a defined set, group, or collection of deblocking thresholds. For example, the encoder may include, or otherwise access, a table, or other data storage structure, that includes the defined sets of deblocking thresholds, wherein each defined set of deblocking thresholds is indexed, or uniquely identified, by a respective corresponding deblocking threshold index.

Identifying the deblocking threshold indices at 1126 may include identifying the first deblocking threshold index for deblocking the frame in a first direction, such as horizontal or vertical, and identifying the second deblocking threshold index, which may differ from the first deblocking threshold index, for deblocking the frame in a second direction, orthogonal to the first direction, such as vertical or horizontal.

Figure 12:
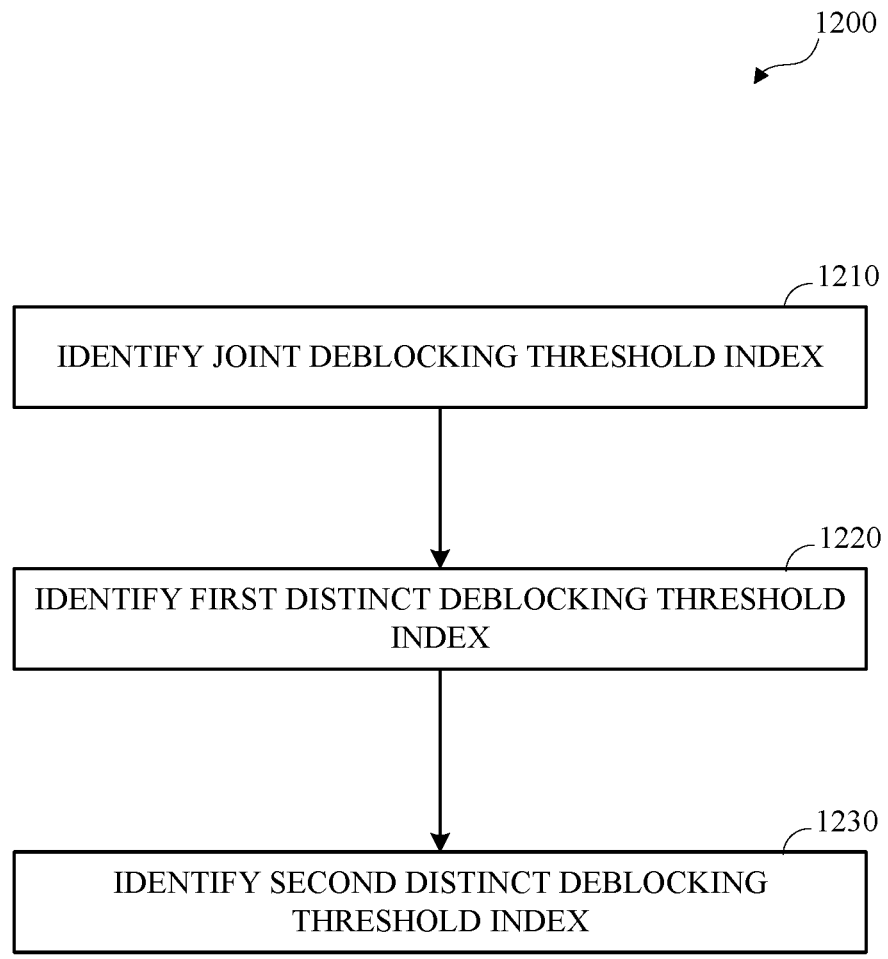
FIG. 12 is a flowchart diagram of an example of identifying deblocking threshold indices in accordance with implementations of this disclosure.

In an example, the first deblocking threshold index may be identified for deblocking vertical block boundaries from the frame and the second deblocking threshold index may be identified for deblocking horizontal block boundaries for the frame. An example of identifying deblocking threshold indices is shown in FIG. 12.

The encoded frame, the deblocking threshold indices, or both may be included in an output, or encoded, bitstream, at 1128. For example, the deblocking threshold indices may be included in a frame header for the encoded frame, and the frame header may be included in the output bitstream, which may include entropy coding the frame header, or a portion thereof.

Including the deblocking threshold indices in the output bitstream may include including an indication of the first deblocking threshold index in the output bitstream and, separately, including an indication of the second deblocking threshold index in the output bitstream. In some implementations, including the an indication of the second deblocking threshold index in the output bitstream may include identifying a differential deblocking threshold index value, such as a difference between the first deblocking threshold index and the second deblocking threshold index, and including the differential deblocking threshold index value, or an indication thereof, in the output bitstream as the second deblocking threshold index.

The encoded bitstream may be output at 1130. For example, the encoded bitstream, or output bitstream, may be transmitted as a signal via a network, such as the network 220 shown in FIG. 2, such that a device, such as the computing device 100 shown in FIG. 1 or the computing and communication devices 100A, 100B, 100C shown in FIG. 2, which may include a decoder, such as the decoder 500 shown in FIG. 5, may receive the signal via the network, may decode the encoded video bitstream, and may generate a reconstructed frame, or a portion of a reconstructed frame, corresponding to the current frame. In another example, the encoded bitstream may be stored in a memory, such as the memory 110 shown in FIG. 1, of a device, such as the computing device 100 shown in FIG. 1 or the computing and communication devices 100A, 100B, 100C shown in FIG. 2, as a stored encoded video, such that the device, or any other device capable of accessing the memory, may retrieve the stored encoded video, such that a decoder, such as the decoder 500 shown in FIG. 5, may decode the encoded video and may generate a reconstructed frame, or a portion of a reconstructed frame, corresponding to the current frame.

Other implementations of encoding using dual deblocking filter thresholds are available. In implementations, additional elements of encoding using dual deblocking filter thresholds can be added, certain elements can be combined, and/or certain elements can be removed.

FIG. 12 is a flowchart diagram of an example of identifying deblocking threshold indices 1200 in accordance with implementations of this disclosure. Identifying deblocking threshold indices 1200 may be implemented in an encoder, such as the encoder 400 shown in FIG. 4. For example, the filtering unit 480 of the encoder 400 shown in FIG. 4 may implement identifying deblocking threshold indices 1200.

Identifying deblocking threshold indices 1200 may include identifying deblocking threshold indices for deblocking a current frame, which may be a decoded frame, and may be similar to the identifying deblocking threshold indices 726 shown in FIG. 7, except as described herein or otherwise clear from context.

Identifying deblocking threshold indices 1200 may include identifying a joint deblocking threshold index at 1210, identifying a first distinct deblocking threshold index at 1220, identifying a second distinct deblocking threshold index at 1230, or any combination thereof.

Although not shown separately in FIG. 12, identifying deblocking threshold indices 1200 may include identifying candidate deblocking threshold indices. Each deblocking threshold index from the candidate deblocking threshold indices may correspond with, and may uniquely identify, a respective defined set of deblocking thresholds. For example, the encoder, or a deblocking threshold index identification unit of the encoder, may read from, or otherwise access, a table, or other data storage structure, that includes the candidate deblocking threshold indices and corresponding sets of deblocking thresholds, such as a table stored in a memory of the encoder, or otherwise accessible by the encoder. In an example, the candidate deblocking threshold indices may have a cardinality of N, the defined sets of deblocking thresholds may have a cardinality of N, and each candidate deblocking threshold index may correspond to a respective defined set of deblocking thresholds.

Identifying the joint deblocking threshold index at 1210 may include identifying the deblocking threshold index corresponding to the set of deblocking thresholds that minimizes a metric, such as a joint error metric, for deblocking the frame, which may include deblocking the frame using the set of deblocking thresholds in a first direction, such as horizontal or vertical, and deblocking the frame using the set of deblocking thresholds in a second direction, which may be orthogonal to the first direction, such as vertical or horizontal. An example of identifying a deblocking threshold index, such as a joint deblocking threshold index, is shown in FIG. 13.

Identifying the first distinct deblocking threshold index at 1220 may include identifying the deblocking threshold index corresponding to the set of deblocking thresholds that minimizes a metrics, such as an error metric, for deblocking the frame using the set of deblocking thresholds corresponding to the first distinct deblocking threshold index in the first direction and using the set of deblocking thresholds corresponding to the joint deblocking threshold index identified at 1210 in the second direction. An example of identifying a deblocking threshold index, such as the first distinct deblocking threshold index, is shown in FIG. 13.

Identifying the second distinct deblocking threshold index at 1230 may include identifying the deblocking threshold index corresponding to the set of deblocking thresholds that minimizes a metric, such as an error metric, for deblocking the frame using the set of deblocking thresholds corresponding to the first distinct deblocking threshold index identified at 1220 in the first direction and using the set of deblocking thresholds corresponding to the second distinct deblocking threshold index in the second direction. An example of identifying a deblocking threshold index, such as the second distinct deblocking threshold index, is shown in FIG. 13.

Figure 13:
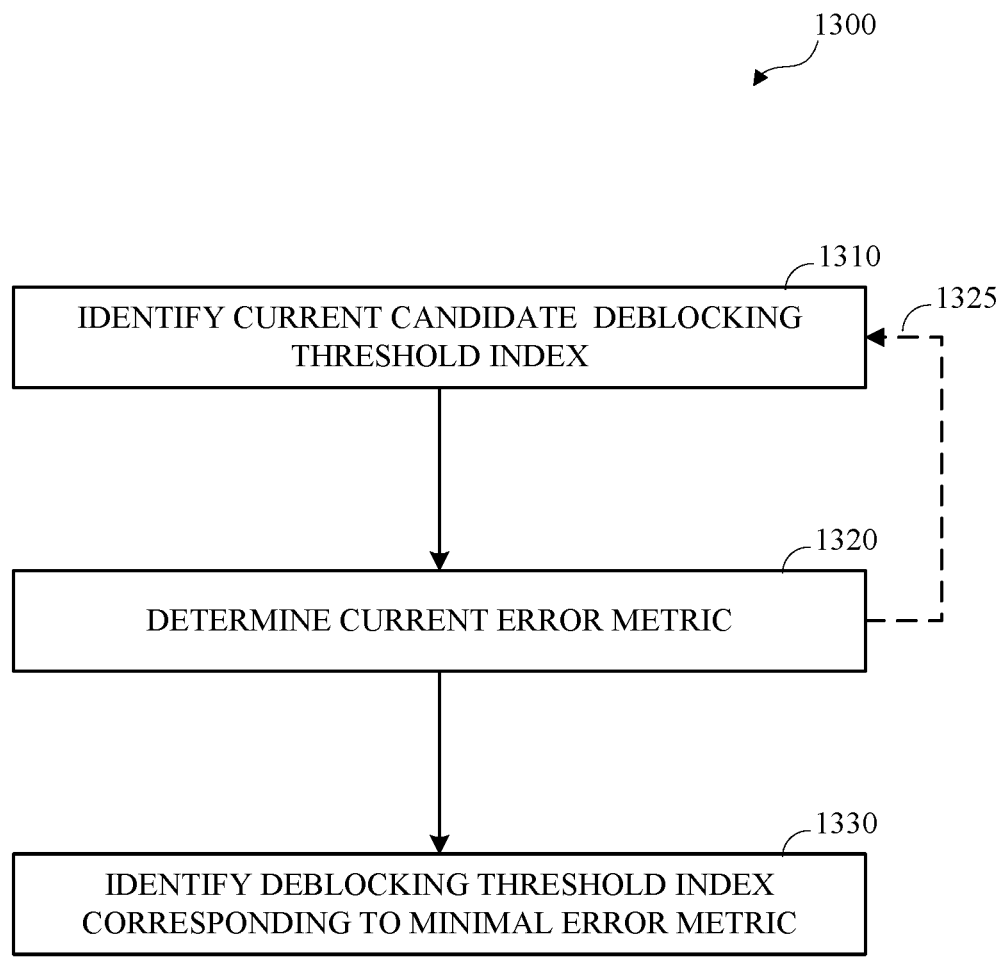
FIG. 13 is a flowchart diagram of an example of identifying a deblocking threshold index in accordance with implementations of this disclosure.

FIG. 13 is a flowchart diagram of an example of identifying a deblocking threshold index 1300 in accordance with implementations of this disclosure. Identifying a deblocking threshold index 1300 may be implemented in an encoder, such as the encoder 400 shown in FIG. 4. For example, the filtering unit 480 of the encoder 400 shown in FIG. 4 may implement identifying a deblocking threshold index 1300.

Identifying a deblocking threshold index 1300 may include identifying a current candidate deblocking threshold index at 1310, determining a current error metric at 1320, identifying the candidate deblocking threshold index corresponding to a minimal error metric at 1330, or any combination thereof.

A current candidate deblocking threshold index may be identified at 1310. Identifying the current candidate deblocking threshold index may include identifying the current deblocking threshold index from a set of candidate deblocking threshold indices, such as the candidate deblocking threshold indices described in relation to FIG. 12. Identifying the current candidate deblocking threshold index at 1310 may include identifying a corresponding set of deblocking thresholds.

For example, identifying a joint deblocking threshold index, such as shown at 1210 in FIG. 12, may include identifying the deblocking threshold index 1300 and identifying the current candidate deblocking threshold index at 1310 may include identifying a set of deblocking thresholds corresponding to the current candidate deblocking threshold index for deblocking the current frame, or the portion thereof, in the a first direction, such as horizontal or vertical, and a second direction, which may be orthogonal to the first direction, such as vertical or horizontal.

In another example, identifying a distinct deblocking threshold index, such as shown at 1220 in FIG. 12 or as shown at 1230 in FIG. 12, may include identifying the deblocking threshold index 1300 and identifying the current candidate deblocking threshold index at 1310 may include identifying a set of deblocking thresholds corresponding to the current candidate deblocking threshold index for deblocking the current frame, or the portion thereof, in the first direction and using a set of deblocking thresholds corresponding to a different distinct deblocking threshold index, such as a separately, or previously, identified distinct deblocking threshold index, in the second direction, or using the set of deblocking thresholds corresponding to the different distinct deblocking threshold index in the first direction and identifying the set of deblocking thresholds corresponding to the current candidate deblocking threshold index for deblocking the current frame, or the portion thereof, in the second direction.

A current error metric may be determined for the current candidate deblocking threshold index at 1320. Determining the current error metric may include deblocking a current frame, or a portion thereof, using the set of deblocking thresholds corresponding to the current candidate deblocking threshold index in a first direction, such as horizontal or vertical, deblocking the current frame, or the portion thereof, using the set of deblocking thresholds corresponding to the current candidate deblocking threshold index in a second direction, which may be orthogonal to the first direction, such as vertical or horizontal, or deblocking the current frame, or the portion thereof, using the set of deblocking thresholds corresponding to the current candidate deblocking threshold index in the first direction and the second direction.

For example, identifying a joint deblocking threshold index, such as shown at 1210 in FIG. 12, may include identifying the deblocking threshold index 1300 and determining the current error metric at 1320 may include deblocking the current frame, or the portion thereof, using the set of deblocking thresholds corresponding to the current candidate deblocking threshold index in the first direction and the second direction. In implementations including identifying a joint deblocking threshold index, the current error metric may be a joint error metric.

In another example, identifying a distinct deblocking threshold index, such as shown at 1220 in FIG. 12 or as shown at 1230 in FIG. 12, may include identifying the deblocking threshold index 1300 and determining the current error metric at 1320 may include deblocking the current frame, or the portion thereof, using the set of deblocking thresholds corresponding to the current candidate deblocking threshold index in the first direction and deblocking the current frame, or the portion thereof, using a set of deblocking thresholds corresponding to a different distinct deblocking threshold index, such as a separately identified distinct deblocking threshold index, in the second direction, or deblocking the current frame, or the portion thereof, using the set of deblocking thresholds corresponding to the current candidate deblocking threshold index in the second direction and deblocking the current frame, or the portion thereof, using the set of deblocking thresholds corresponding to the different distinct deblocking threshold index in the first direction.

Figure 14:
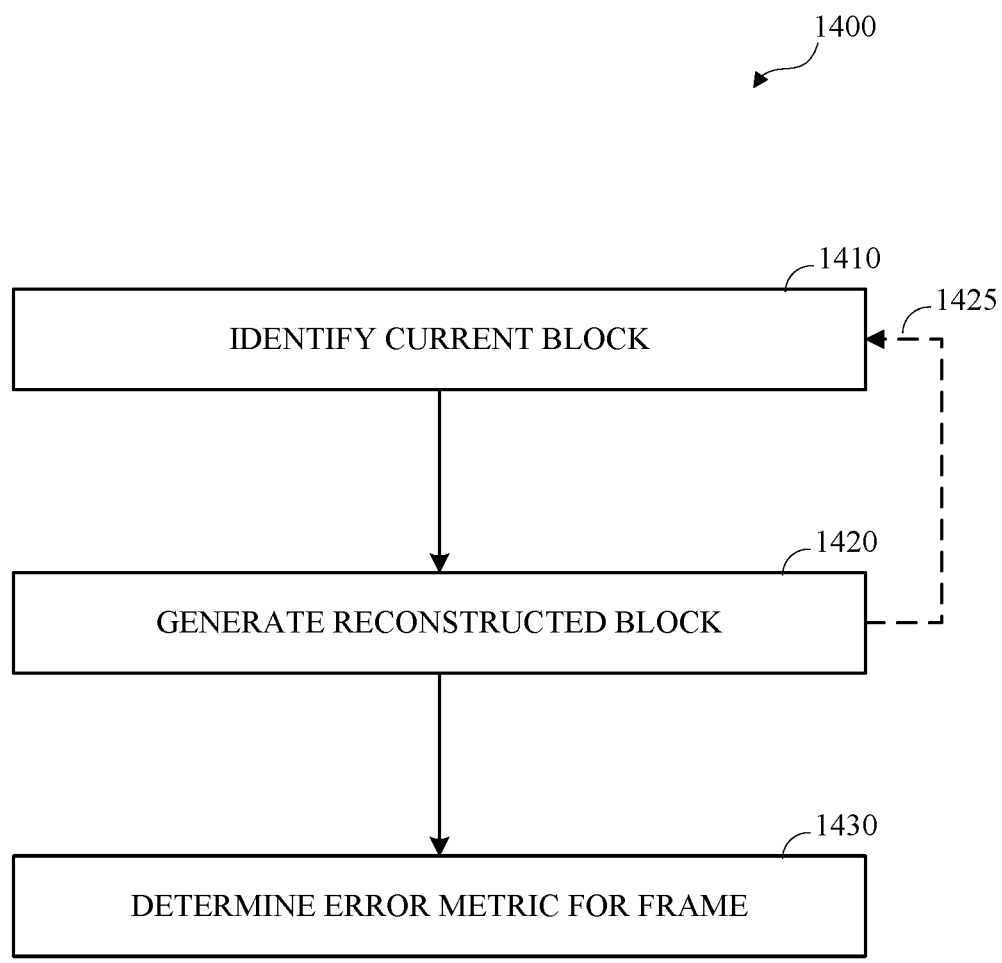
FIG. 14 is a flowchart diagram of an example of determining a current error metric in accordance with implementations of this disclosure.

Determining the current error metric at 1320 may include generating a candidate reconstructed frame, or a portion thereof, and identifying the current error metric based on differences between the candidate reconstructed frame, or the portion thereof, and the corresponding input frame, or the corresponding portion thereof, such as by determining a sum of absolute differences (SAD), a sum of squared differences (SSD), or another error metric, between the candidate reconstructed frame and the corresponding input frame. An example of determining a current error metric is shown in FIG. 14.

Respective error metrics, each corresponding to deblocking the current frame, or the portion thereof, in the first direction, deblocking the current frame, or the portion thereof, in the second direction, or deblocking the current frame, or the portion thereof, in the first direction and the second direction, using a corresponding candidate deblocking threshold index from the candidate deblocking threshold indices, may be determined, as indicated by the broken line arrow at 1325.

For example, identifying a joint deblocking threshold index, such as shown at 1210 in FIG. 12, may include identifying the deblocking threshold index 1300 and determining the current error metric at 1320 may include determining respective error metrics, which may be joint error metrics, using each respective candidate deblocking threshold index from the candidate deblocking threshold indices by deblocking the current frame, or the portion thereof, using a respective set of deblocking thresholds corresponding to the respective candidate deblocking threshold index in the first direction and the second direction.

In some implementations, identifying the current candidate deblocking threshold index at 1310 may omit identifying a separately identified distinct deblocking threshold index from the candidate deblocking threshold indices, such as a distinct deblocking threshold index separately identified for deblocking the current frame, or the portion thereof, in the first direction (or the second direction), as the current candidate deblocking threshold index for deblocking the current frame, or the portion thereof, in the second direction (or the first direction), and determining the respective error metrics may omit determining an error metric corresponding to deblocking the current frame, or the portion thereof, using the separately identified distinct deblocking threshold index in the first direction and the second direction.

For example, identifying a distinct deblocking threshold index, such as shown at 1220 in FIG. 12 or as shown at 1230 in FIG. 12, may include identifying the deblocking threshold index 1300 and determining the current error metric at 1320 may include determining error metrics (first error metrics), respectively corresponding to each candidate deblocking threshold index from the candidate deblocking threshold indices that differs from, or other than, a distinct deblocking threshold index, such as a separately identified distinct deblocking threshold index, by deblocking the current frame, or the portion thereof, using the respective set of deblocking thresholds corresponding to the respective current candidate deblocking threshold index in the first direction and deblocking the current frame, or the portion thereof, using a set of deblocking thresholds corresponding to the distinct deblocking threshold index in the second direction, or by deblocking the current frame, or the portion thereof, using the set of deblocking thresholds corresponding to the different distinct deblocking threshold index in the first direction and deblocking the current frame, or the portion thereof, using the respective set of deblocking thresholds corresponding to the current candidate deblocking threshold index in the second direction.

The deblocking threshold index corresponding to the minimal error metric may be identified at 1330. Identifying the deblocking threshold index corresponding to the minimal error metric may include identifying the minimal error metric from a set of error metrics. Each error metric from the set of error metrics may correspond with a respective current error metric determined at 1320.

For example, identifying the deblocking threshold index 1300 may include identifying a joint deblocking threshold index, such as shown at 1210 in FIG. 12, determining the current error metric at 1320 may include determining error metrics including a respective error metric corresponding deblocking the current frame, or the portion thereof, in the first direction and the second direction using the respective set of deblocking thresholds corresponding to each respective candidate deblocking threshold index from the candidate deblocking threshold indices, and identifying the deblocking threshold index at 1330 may include identifying the minimal error metric from the error metrics determined at 1320, and identifying the candidate deblocking threshold index corresponding to the minimal error metric as the deblocking threshold index at 1330.

In another example, identifying deblocking threshold indices, such as shown at 1200 in FIG. 12, may include identifying a joint deblocking threshold index, such as shown at 1210 in FIG. 12, identifying a first distinct deblocking threshold index, such as shown at 1220 in FIG. 12, and identifying a second distinct deblocking threshold index, such as shown at 1230 in FIG. 12.

Identifying the joint deblocking threshold index may include identifying a minimal joint error metric corresponding to deblocking the current frame, or the portion thereof, in the first direction using a set of deblocking thresholds and deblocking the current frame, or the portion thereof, in the second direction using the set of deblocking thresholds.

Identifying the first distinct deblocking threshold index may include identifying the deblocking threshold index corresponding to the minimal error metric from a set of error metrics including the minimal joint error metric and including candidate error metrics corresponding to deblocking the current frame, or the portion thereof, in the first direction using the set of deblocking thresholds corresponding to the joint deblocking threshold index and deblocking the current frame, or the portion thereof, in the second direction using other sets of deblocking thresholds.

Identifying the second distinct deblocking threshold index may include identifying the deblocking threshold index corresponding to the minimal error metric from a set of error metrics including the error metric corresponding to the first distinct deblocking threshold index and including candidate error metrics corresponding to deblocking the current frame, or the portion thereof, in the second direction using the set of deblocking thresholds corresponding to the first distinct deblocking threshold index and deblocking the current frame, or the portion thereof, in the second direction using other sets of deblocking thresholds.

FIG. 14 is a flowchart diagram of an example of determining a current error metric 1400 in accordance with implementations of this disclosure. Determining a current error metric 1400 may be implemented in an encoder, such as the encoder 400 shown in FIG. 4. For example, the filtering unit 480 of the encoder 400 shown in FIG. 4 may implement determining a current error metric 1400.

Determining a current error metric 1400 may include identifying a current block at 1410, generating a reconstructed block at 1420, determining an error metric at 1430, or any combination thereof.

Although not shown separately in FIG. 14, determining a current error metric 1400 may include identifying a first set of deblocking thresholds for deblocking a current frame in a first direction, such as horizontal or vertical, and identifying a second set of deblocking thresholds for deblocking the current frame in a second direction, which may be orthogonal to the first direction, such as vertical or horizontal.

The first set of deblocking thresholds may correspond to a joint deblocking threshold index, such as the joint deblocking threshold index identified as shown at 1210 in FIG. 12, or may correspond to a first distinct deblocking threshold index, such as the first distinct deblocking threshold index identified as shown at 1220 in FIG. 12. The second set of deblocking thresholds may correspond to the joint distinct deblocking threshold index or may correspond with a second distinct deblocking threshold index, such as the second distinct deblocking threshold index identified as shown at 1230 in FIG. 12.

A current block of the current frame may be identified at 1410. For example, the current frame may include blocks, such as prediction blocks, and a respective current block from the frame may be identified based on a scan order, such as raster order. Although not shown separately in FIG. 14, determining a current error metric 1400 may include identifying information indicating transform block sizes for the current block, one or more adjacent blocks, adjacent to the current block, or both.

A reconstructed block may be generated at 1420. The current frame may be a decoded frame, the current block identified at 1410 may be a decoded block, and generating the reconstructed block at 1420 may include deblocking the current block.

Deblocking the current block may include deblocking the current block, which may be a decoded block, using a first deblocking threshold index for deblocking the current block in the first direction and using a second deblocking threshold index for deblocking the current block in the second direction.

The first deblocking threshold index and the second deblocking threshold index may be a joint deblocking threshold index or the first deblocking threshold index may differ from the second deblocking threshold index. For example, the identified deblocking threshold index may be a joint deblocking threshold index and deblocking the current block may include using the identified deblocking threshold index as a horizontal deblocking threshold index for deblocking the decoded block in a horizontal direction and as a vertical deblocking threshold index for deblocking the decoded block in a vertical direction, or using the identified deblocking threshold index as a vertical deblocking threshold index for vertical deblocking the decoded block in a vertical direction and as a horizontal deblocking threshold index for horizontal deblocking the decoded block in a horizontal direction. An example of deblocking a current block is shown in FIG. 15.

As shown in FIG. 14, determining the current error metric 1400 may include generating a respective reconstructed block for each block of the current frame as indicated by the broken line arrow at 1425. For example, for each block of the current frame, a respective reconstructed block may be generated at 1420, which may include deblocking the current block in the first direction and the second direction. Although not shown separately in FIG. 14, determining a current error metric 1400 may include generating a respective partially reconstructed block for each block of the current frame by deblocking the respective current block in the first direction and generating a reconstructed block for each block of the current frame by deblocking the corresponding partially reconstructed block in the second direction.

A current error metric may be determined at 1430. The current error metric may be determined based on differences between the current reconstructed frame, or a portion thereof, and the corresponding input frame, or a corresponding portion thereof, such as by determining a sum of absolute differences, a sum of squared differences, or another error metric, between the current reconstructed frame and the corresponding input frame.

Figure 15:
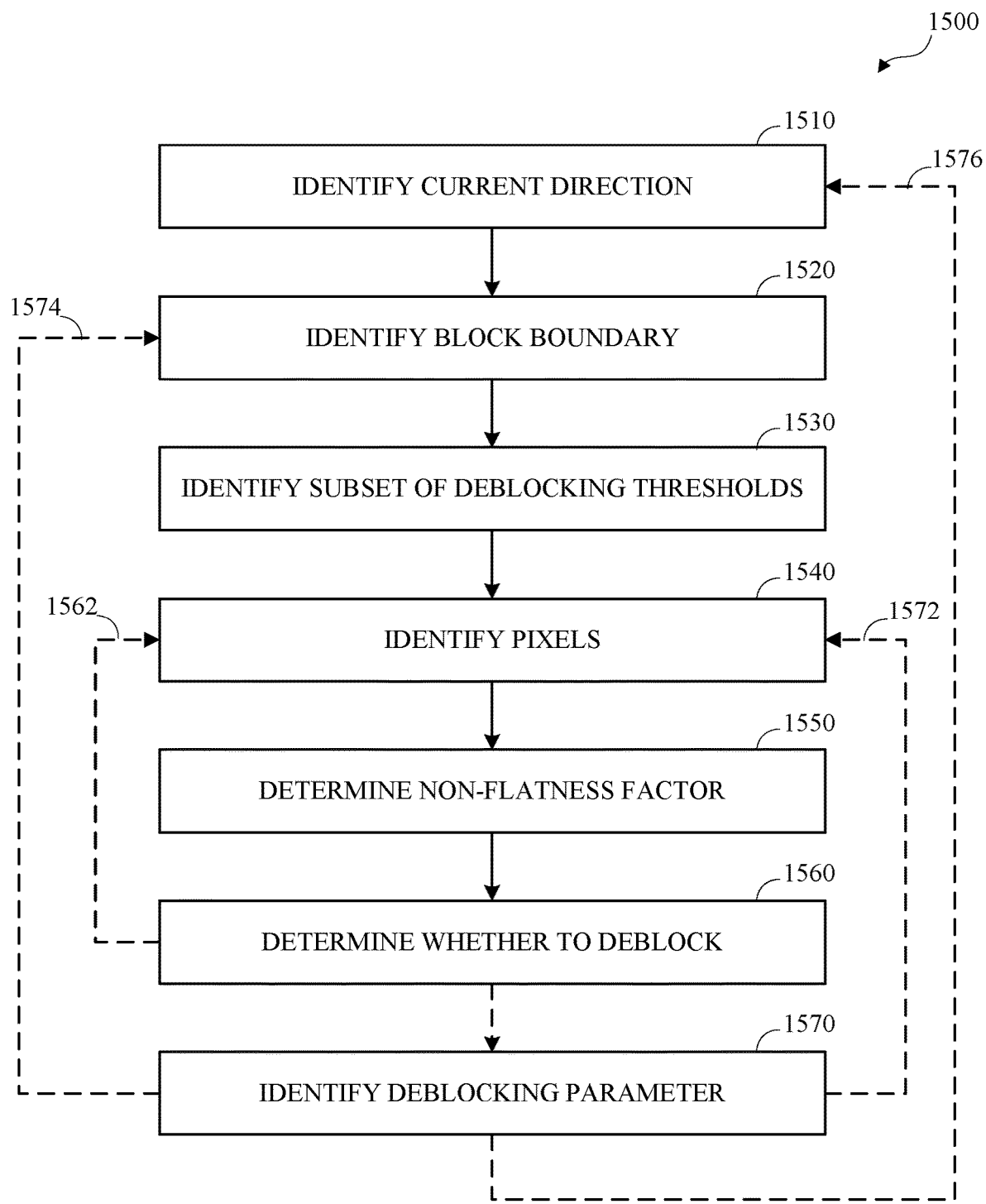
FIG. 15 is a flowchart diagram of an example of deblocking a current block in accordance with implementations of this disclosure.

FIG. 15 is a flowchart diagram of an example of deblocking a current block 1500 in accordance with implementations of this disclosure. Deblocking a current block 1500, which may include generating a reconstructed block, may be implemented in an encoder, such as the encoder 400 shown in FIG. 4. For example, the filtering unit 480 of the encoder 400 shown in FIG. 4 may implement deblocking a current block 1500.

Deblocking the current block may include deblocking the current block based on a first deblocking threshold index or based on the first deblocking threshold index and a second deblocking threshold index. For example, the first deblocking threshold index may be a joint deblocking threshold index, and deblocking the current block may include deblocking the current block in a first direction based on the joint deblocking threshold index and deblocking the current block in a second direction based on the joint deblocking threshold index. In another example, the first deblocking threshold index may be a first distinct deblocking threshold index, the second deblocking threshold index may be a second distinct deblocking threshold index, and deblocking the current block may include deblocking the current block in a first direction based on the first distinct deblocking threshold index and deblocking the current block in a second direction based on the second distinct deblocking threshold index.

The current block may have block boundaries, borders, edges, or sides. For example, as shown in FIGS. 6-10, the current block may have four block boundaries, which may include two block boundaries in the vertical direction, such as a top block boundary and a bottom block boundary, and two block boundaries in the horizontal direction such as a left block boundary and a right block boundary. The current block may be immediately adjacent to adjacent blocks, such as an adjacent block above the current block, which may be adjacent to the current block along the top block boundary, an adjacent block below the current block, which may be adjacent to the current block along the bottom block boundary, an adjacent block to the left of the current block, which may be adjacent to the current block along the left block boundary, and an adjacent block to the right of the current block, which may be adjacent to the current block along the right block boundary. Each of the current block and the adjacent blocks may correspond to respective transform blocks. For example, the current block may be an N×N block and may correspond with an N×N transform block, or the current block may correspond to smaller transform blocks, such as $x^2N/x×N/x$ transform blocks.

As shown in FIG. 15, deblocking a current block 1500 may include identifying a current direction at 1510, identifying a current block boundary at 1520, identifying a current subset of deblocking thresholds at 1530, identifying pixels at 1540, determining a non-flatness factor at 1550, determining whether to deblock at 1560, identifying a deblocking parameter at 1570, or a combination thereof.

A current direction may be identified at 1510. For example, the current direction may be identified as a first direction, such as horizontal or vertical, or a second direction, which may be orthogonal to the first direction, such as vertical or horizontal.

Identifying the current direction at 1510 may include identifying a current deblocking threshold index for deblocking the current frame in the current direction. For example, the current deblocking threshold index for deblocking the current frame in the current direction may be identified as shown at 1310 in FIG. 13. Identifying the current deblocking threshold index for deblocking the current frame in the current direction may include identifying a current set, group, or collection of deblocking thresholds associated with the current deblocking threshold index for deblocking the current frame in the current direction. For example, the encoder may read from, or otherwise access, a table, or other data storage structure, that includes the current deblocking threshold index and corresponding deblocking thresholds, such as a table stored in a memory of the encoder, or otherwise accessible by the encoder.

A current block boundary may be identified at 1520. For example, the current direction may be vertical and the horizontal block boundary corresponding to the top side, border, or edge of the current block may be identified as the current block boundary or the horizontal block boundary corresponding to the bottom side, border, or edge of the current block may be identified as the current block boundary. In another example, the current direction may be horizontal and the vertical block boundary corresponding to the left side, border, or edge of the current block may be identified as the current block boundary or the vertical block boundary corresponding to the right side, border, or edge of the current block may be identified as the current block boundary.

A current subset of deblocking thresholds may be identified for deblocking the current block boundary at 1530. Identifying the current subset of deblocking thresholds at 1530 may include identifying a current minimum transform block size corresponding to the current block boundary identified at 1520.

Identifying the current minimum transform block size corresponding to the current block boundary at 1530 may include identifying the transform block sizes for each transform block along the current block boundary, which may include transform blocks corresponding to the current block, transform blocks adjacent to the current block along the current block boundary, or both.

For example, referring to FIG. 8, the current block may be the top-right block 820, the current direction may be horizontal, the current block boundary 850 may be the vertical boundary between the current block 820 and the horizontally adjacent block 810, the current block 820 may be a 16×16 block, the transform block size for the current block 820 may be 16×16, the transform block size for the adjacent block 810 may be 8×8, and the current minimum transform block size may be 8×8.

Referring to FIG. 15, identifying current subset of deblocking thresholds at 1530 may include identifying the current subset of deblocking thresholds based on the current minimum transform block size, which may include identifying the current subset of deblocking thresholds from the current set of deblocking thresholds, which may be the set of deblocking thresholds identified based on the current deblocking threshold index.

For example, the current set of deblocking thresholds identified based on the current deblocking threshold index may include a respective subset of deblocking thresholds corresponding to each respective available transform block size, and identifying current subset of deblocking thresholds at 1530 may include identifying the subset of deblocking thresholds corresponding to the current minimum transform block size from the current set of deblocking thresholds. The current subset of deblocking thresholds may be identified as the current deblocking threshold. For example, one or more of the deblocking thresholds may be associated with a respective minimum transform block size, and a subset of the deblocking thresholds, associated with the current minimum transform block size, may be identified as the current deblocking threshold.

In some implementations, the minimum transform block size for a first block boundary in the current direction may match a previously identified minimum transform block size for the opposite block boundary from the current block in the current direction and deblocking thresholds identified for deblocking the opposite block boundary may be identified as the deblocking thresholds for deblocking the current block boundary. In some implementations, the minimum transform block size for the current block boundary in the current direction may differ from a previously identified minimum transform block size for the opposite block boundary from the current block in the current direction and the deblocking thresholds for deblocking the current block boundary may be identified separately from the deblocking thresholds identified for deblocking the opposite block boundary.

Identifying the current subset of deblocking thresholds at 1530 may include identifying a current deblocking determination threshold for deblocking the current block boundary. For example, the current subset of deblocking thresholds identified at 1530 may include the current deblocking determination threshold and the current deblocking determination threshold may be identified from the current subset of deblocking thresholds.

Current pixels, such as a current set, group, or collection of pixels, may be identified at 1540. The current pixels may include pixels from the current block, an adjacent block adjacent to the current block along the current block boundary in the current direction, or both. For example, the current direction identified at 1510 may be vertical, the current block may include columns of pixels, the adjacent block may include corresponding columns of pixels, and identifying the current pixels at 1540 may include identifying a defined cardinality, number, or count, (N) of pixels from a current column of the current block, such the N pixels from the current column of the current block most proximate to the current block boundary, and may include identifying the defined cardinality of pixels from the current column of the adjacent block, such the N pixels from the current column of the adjacent block most proximate to the current block boundary. In some implementations, the cardinality of pixels identified from the current block may differ from the cardinality of pixels identified from the adjacent block.

Metrics, such as non-flatness factors may be determined at 1550. A non-flatness factor may indicate flatness, or non-flatness, for an identified set of pixels. For example, a current non-flatness factor may indicate flatness for an identified set of pixels from the current block, such as the pixels from the current block identified at 1540, and an adjacent non-flatness factor may indicate flatness, or non-flatness, for the corresponding pixels of the adjacent block. For example, the flatness, or non-flatness, metric or factor may indicate a maximum difference among the respective pixels.

For example, with reference to FIG. 9, the current block may be the bottom left block 930, the current block boundary may be the vertical boundary between the current block 930 and the adjacent block 940, which may be an adjacent decoded block. A respective current flatness factor may be identified for each row of the current block 940, and a respective adjacent flatness factor may be identified for each row of the adjacent block 940. In an example, the current flatness factor for the fifth row from the top of the current block 930 may be identified based on the pixels labeled c0, c1, c2, c3, c4, c5, c6, c7 and the adjacent flatness factor for the fifth row from the top of the adjacent block 940 may be identified based on the pixels labeled a0, a1, a2, a3, a4, a5, a6, a7.

In an example, the current flatness, or non-flatness, factor for the current block (c) 930 may be identified based on the maximum of the absolute value of a difference between the pixel labeled c4 and the pixel labeled c7, the absolute value of a difference between the pixel labeled c5 and the pixel labeled c7, and the absolute value of a difference between the pixel labeled c6 and the pixel labeled c7, which may be expressed as the following:

$$Nf(c) = \max(|c4-c7|, |c5-c7|, |c6-c7|). \quad \text{[Equation 1]}$$

The corresponding adjacent flatness, or non-flatness, factor for the adjacent block (a) may be identified based on the maximum of the absolute value of a difference between the pixel labeled a0 and the pixel labeled a1, the absolute value of a difference between the pixel labeled a0 and the pixel labeled a2, and the absolute value of a difference between the pixel labeled a0 and the pixel labeled a3, which may be expressed as the following:

$$Nf(a) = \max(|a0-a1|, |a0-a2|, |a0-a3|). \quad \text{[Equation 2]}$$

In another example, with reference to FIG. 10, the current block may be the top right block 1020, the current block boundary may be the horizontal boundary between the current block 1020 and the vertically adjacent block 1040. A current flatness factor may be identified for each column of the current block 1020, and an adjacent flatness factor may be identified for each column of the adjacent block 1040. For example, the current flatness factor for the fifth column from the left of the current block 1020 may be identified based on the pixels labeled c0, c1, c2, c3, c4, c5, c6, and c7 and the adjacent flatness factor for the fifth column from the left of the adjacent block 1040 may be identified based on the pixels labeled a0, a1, a2, a3, a4, a5, a6, and a7.

As shown in FIG. 15, a current deblocking determination may be identified at 1560. For example, whether to deblock the pixels identified at 1540 may be determined at 1560 based on the current deblocking determination threshold identified at 1530 and the non-flatness factors determined at 1550. For example, the current block boundary may align with an edge in the content captured by the frame, and deblocking pixels along the current block boundary may be omitted. In another example, the block boundary may be unaligned with edges in the content captured by the frame, and the pixels along the current block boundary may be deblocked.

Determining whether to deblock the pixels identified at 1540 from the current block along the current block boundary may include determining whether the current non-flatness factor identified at 1550 for the current row or column of the current block (Nf(c)) is less than the current deblocking determination threshold value identified at 1530, and determining whether the adjacent non-flatness factor for the adjacent block (Nf(a)) is less than the current deblocking determination threshold value.

For example, the current non-flatness factor for the current row or column of the current block (Nf(a)) may be less than the deblocking determination threshold and the adjacent non-flatness factor for the current row or column of the adjacent block (Nf(a)) may be less than the deblocking determination threshold, and a determination indicating deblocking for the current row or column of the current block boundary may be identified.

In another example, the current non-flatness factor for the current row or column of the current block (Nf(a)) may be less than the deblocking determination threshold and the adjacent non-flatness factor for the current row or column of the adjacent block (Nf(a)) may be at least, such as equal to or greater than, the deblocking determination threshold and a determination indicating the omission of deblocking for the current row or column of the current block boundary may be identified.

In another example, the current non-flatness factor for the current row or column of the current block (Nf(a)) may be at least, such as equal to or greater than, the deblocking determination threshold and the adjacent non-flatness factor for the current row or column of the adjacent block (Nf(a)) may be less than the deblocking determination threshold, and a determination indicating the omission of deblocking for the current row or column of the current block boundary may be identified.

In another example, the current non-flatness factor for the current row or column of the current block (Nf(a)) may be at least, such as equal to or greater than, the deblocking determination threshold and the adjacent non-flatness factor for the current row or column of the adjacent block (Nf(a)) may be at least, such as equal to or greater than, the deblocking determination threshold, and a determination indicating the omission of deblocking for the current row or column of the current block boundary may be identified.

The deblocking determination identified at 1560 may indicate deblocking for the pixels identified at 1540 and a deblocking parameter or deblocking filter parameter, such as a deblocking filter, deblocking filter type, deblocking filter strength, or a combination thereof, for deblocking the pixels identified at 1540 may be identified at 1570. Identifying the deblocking parameter may include identifying one or more deblocking filter thresholds, which may differ from the deblocking determination threshold, from the current subset of deblocking thresholds and identifying the deblocking parameter based on the identified deblocking filter thresholds. For example, the deblocking filter thresholds may be identified or adjusted based on prediction mode, motion vector consistency, transform block size, transform block type, or the like.

Deblocking a current block boundary may include identifying pixels at 1540 for each row or column of the current block, determining a non-flatness factor at 1550 for each row or column of the current block, determining whether to deblock at 1560 for each row or column of the current block, identifying a deblocking parameter at 1570 for each row or column of the current block, or a combination thereof, as indicated by the broken line arrows at 1562 and 1572.

Deblocking the current block in the current direction may include identifying each block boundary at 1520 for the current direction, and for each respective block boundary, identifying the current subset of deblocking thresholds at 1530 for the respective block boundary, identifying pixels at 1540 for each row or column of the current block for the respective block boundary, determining a non-flatness factor at 1550 for each row or column of the current block for the respective block boundary, determining whether to deblock at 1560 for each row or column of the current block for the respective block boundary, identifying a deblocking parameter at 1570 for each row or column of the current block for the respective block boundary, or a combination thereof, as indicated by the broken line arrow at 1574.

Deblocking the current block may include identifying each respective direction at 1510, and, for each respective direction, identifying each block boundary at 1520 for the respective direction, and for each respective block boundary, identifying the current subset of deblocking thresholds at 1530 for the respective block boundary, identifying pixels at 1540 for each row or column of the current block for the respective block boundary, determining a non-flatness factor at 1550 for each row or column of the current block for the respective block boundary, determining whether to deblock at 1560 for each row or column of the current block for the respective block boundary, identifying a deblocking parameter at 1570 for each row or column of the current block for the respective block boundary, or a combination thereof, as indicated by the broken line arrow at 1576.

Figure 16:
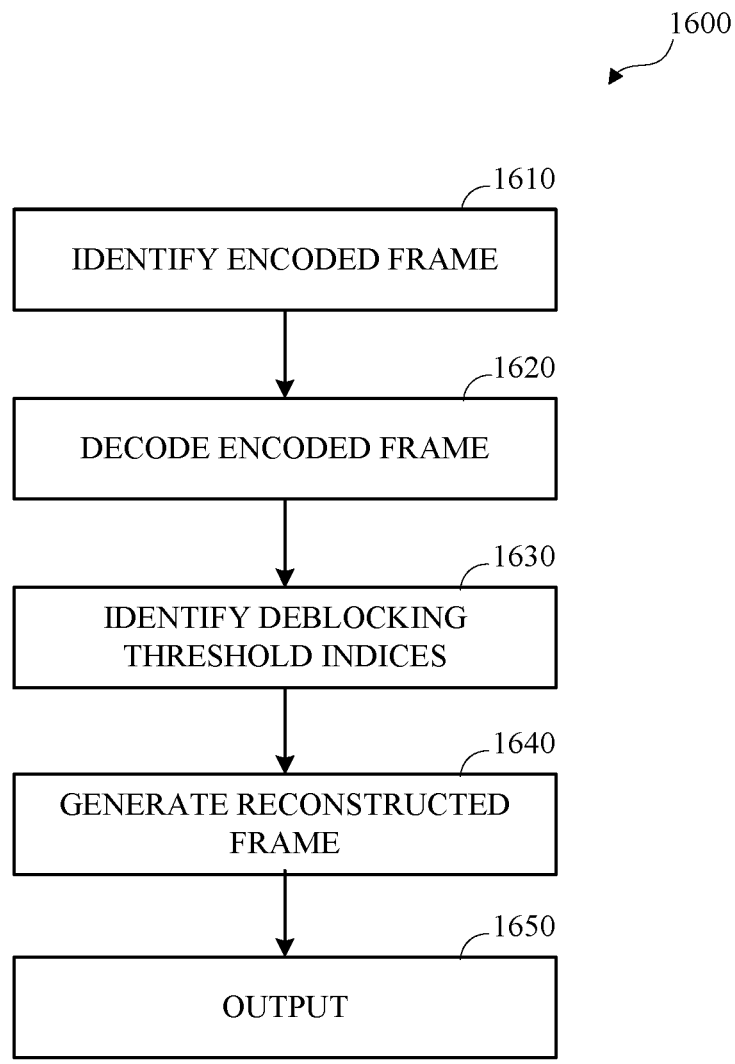
FIG. 16 is a flowchart diagram of an example of decoding using dual deblocking filter thresholds in accordance with implementations of this disclosure.

FIG. 16 is a flowchart diagram of an example of decoding using dual deblocking filter thresholds 1600 in accordance with implementations of this disclosure. Decoding using dual deblocking filter thresholds 1600 may be implemented in a decoder, such as the decoder 500 shown in FIG. 5.

Decoding using dual deblocking filter thresholds 1600 may include identifying an encoded frame at 1610, generating a decoded frame at 1620, identifying deblocking threshold indices at 1630, generating a reconstructed frame at 1640, outputting the reconstructed frame at 1650, or any combination thereof.

An encoded frame may be identified at 1610. For example, the decoder may receive, or otherwise access, an encoded bitstream and may identify the encoded frame from the encoded bitstream, or a portion thereof.

A decoded frame may be generated at 1620. For example, the decoded frame may be generated by decoding the encoded frame identified at 1610. Generating the decoded frame may include generating decoded blocks. Generating a decoded block may include decoding a portion of the encoded bitstream.

Deblocking threshold indices may be identified at 1630. For example, the deblocking threshold indices may be identified by decoding, reading, or extracting the deblocking threshold indices from the encoded bitstream, such as from a frame header associated with or corresponding to the current (reconstructed or decoded) frame.

Identifying the deblocking threshold indices may include identifying a first deblocking threshold index from the encoded bitstream, identifying a second deblocking threshold index from the encoded bitstream, or both. For example, identifying the deblocking threshold indices may include identifying the first deblocking threshold index for deblocking the current frame in a first direction, such as horizontal or vertical, and identifying the second deblocking threshold index for deblocking the current frame in a second direction, such as vertical or horizontal.

In some implementations, identifying the second deblocking threshold index may include extracting information indicating the second deblocking threshold index, such as a differential deblocking threshold index value, from the encoded bitstream, and identifying a sum of the differential deblocking threshold index value and the first deblocking threshold index as the second deblocking threshold index. In some implementations, identifying the second deblocking threshold index may include determining that the information indicating the second deblocking threshold index includes a differential deblocking threshold index value.

A reconstructed frame may be generated at 1640. Generating the reconstructed frame may include deblocking the decoded frame, which may include generating reconstructed blocks, and deblocking the reconstructed blocks.

Deblocking the decoded frame may include deblocking each decoded block from the frame, which may include identifying each respective decoded block from the frame and generating a corresponding reconstructed block by deblocking the respective decoded block, which may be similar to the block identification indicated at 1410 in FIG. 14 and the block reconstruction indicated at 1420 in FIG. 14, described as indicated herein or otherwise clear from context. Deblocking the current block may be similar to the deblocking shown in FIG. 15, except as described herein or otherwise clear from context. For example, each reconstructed block may be generated by deblocking a corresponding decoded block based on the first deblocking threshold index and the second deblocking threshold index. The reconstructed blocks may be included in the reconstructed frame.

For example, the first deblocking threshold index may be a vertical deblocking threshold index, and generating the reconstructed frame may include vertical deblocking based on the first deblocking threshold index and horizontal deblocking based on the second deblocking threshold index. In another example, the first deblocking threshold index may be a horizontal deblocking threshold index and generating the reconstructed frame may include horizontal deblocking based on the first deblocking threshold index and vertical deblocking based on the second deblocking threshold index.

Deblocking in the first direction may include generating a partially deblocked frame by deblocking the decoded frame in the first direction based on the first deblocking threshold index. Deblocking in the second direction may include generating the reconstructed frame by deblocking the partially deblocked frame in the second direction based on the second deblocking threshold index.

Deblocking in the first direction, or the second direction, may include identifying a current deblocking threshold, which may include a set of deblocking thresholds, from sets of deblocking thresholds based on the respective (current) deblocking threshold index. For example, the decoder, or a deblocking threshold identification unit of the decoder, may read from, or otherwise access, a table, or other data storage structure, that includes sets of deblocking thresholds, such as a table stored in a memory of the decoder, or otherwise accessible by the decoder, and may identify a first set of deblocking thresholds corresponding to the first deblocking threshold index and a second set of deblocking thresholds corresponding to the second deblocking threshold index.

The reconstructed frame may be output at 1650. For example, the reconstructed frame may be included in an output video stream, such as the output video stream 504 shown in FIG. 5, for storage or presentation to a user.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. An apparatus comprising:
a processor configured to generate a reconstructed frame by decoding an encoded bitstream, wherein decoding the encoded bitstream includes:
generating a decoded block by decoding a portion of the encoded bitstream;
reading a first deblocking threshold index from the encoded bitstream, wherein the first deblocking threshold index identifies a first defined set of deblocking thresholds;
identifying a second deblocking threshold index from the encoded bitstream, wherein the second deblocking threshold index identifies a second defined set of deblocking thresholds;
generating a reconstructed block based on the decoded block, wherein generating the reconstructed block includes deblocking based on the first defined set of deblocking thresholds and the second defined set of deblocking thresholds, wherein generating the reconstructed frame includes:
on a condition that the first deblocking threshold index is a vertical deblocking threshold index, deblocking includes vertical deblocking based on the first deblocking threshold index and horizontal deblocking based on the second deblocking threshold index; and
on a condition that the first deblocking threshold index is a horizontal deblocking threshold index, deblocking includes horizontal deblocking based on the first deblocking threshold index and vertical deblocking based on the second deblocking threshold index; and
including the reconstructed block in the reconstructed frame; and
wherein the processor is configured to output the reconstructed frame.

2. The apparatus of claim 1, wherein the processor is configured to read the first deblocking threshold index by reading the first deblocking threshold index from a frame header corresponding to the reconstructed frame.

3. The apparatus of claim 1, wherein the processor is configured to identify the second deblocking threshold index by:
reading a differential deblocking threshold index value from the encoded bitstream; and
identifying a sum of the differential deb/coking threshold index value and the first deblocking threshold index as the second deblocking threshold index.

4. The apparatus of claim 1, wherein deblocking includes:
identifying a current deblocking threshold based on a current deblocking threshold index, wherein:
on a condition that the current deblocking threshold index is the first deblocking threshold index, the current deblocking threshold is a first deblocking threshold from the first defined set of deblocking thresholds; and
on a condition that the current deblocking threshold index is the second deblocking threshold index, the current deblocking threshold is a second deblocking threshold from the second defined set of deblocking thresholds.

5. The apparatus of claim 4, wherein the processor is configured to identify the current deblocking threshold by:
identifying a current set of deblocking thresholds from a plurality of deblocking thresholds based on the current deblocking threshold index, wherein:
on a condition that the current deblocking threshold index is the first deblocking threshold index, the current set of deblocking thresholds is the first defined set of deblocking thresholds; and
on a condition that the current deblocking threshold index is the second deblocking threshold index, the current set of deblocking thresholds is the second defined set of deblocking thresholds;

identifying a current minimum transform block size corresponding to a current block boundary of the decoded block in a current direction; and identifying a subset of deblocking thresholds from the current set of deblocking thresholds based on the current minimum transform block size as the current deblocking threshold.

6. The apparatus of claim 5, wherein the processor is configured to identify the current deblocking threshold by:

in response to a determination that the current minimum transform block size differs from a second minimum transform block size for a second block boundary of the decoded block opposite the current block boundary, identifying the current deblocking threshold such that the current deblocking threshold differs from a deblocking threshold for the second block boundary; and in response to a determination that the current minimum transform block size is equivalent to the second minimum transform block size, identifying the deblocking threshold for the second block boundary as the current deblocking threshold.

7. The apparatus of claim 5, wherein deblocking includes;

in response to a current deblocking determination indicating deblocking for the current block boundary, deblocking the current block boundary; and generating the current deblocking determination by:

identifying a current flatness factor based on pixel values from the decoded block along the current direction;

in response to a determination that the current flatness factor exceeds a deblocking determination threshold value from the current deblocking threshold, identifying the current deblocking determination as indicating The an omission of deblocking;

identifying an adjacent flatness factor based on pixel values from an adjacent decoded block along the current direction;

in response to a determination that the adjacent flatness factor exceeds the deblocking determination threshold value, identifying the current blocking determination as indicating the omission of deblocking; and in response to a determination that the current flatness factor is within the deblocking determination threshold value and the adjacent flatness factor is within the deblocking determination threshold value, identifying the current blocking determination as indicating deblocking.

8. The apparatus of claim 5, wherein deblocking includes:

in response to a current deblocking determination indicating deblocking for the current block boundary, deblocking the current block boundary, wherein deblocking the current block boundary includes:

identifying a deblocking filter threshold from the subset of deblocking thresholds;

identifying a deblocking filter parameter based on the deblocking filter threshold; and deblocking the current block boundary using the deblocking filter parameter.

9. An apparatus comprising:

a processor configured to generate an encoded frame by encoding an input frame, wherein encoding the input frame includes:

generating a decoded frame by decoding the encoded frame;

generating a reconstructed frame by reconstructing the decoded frame, wherein reconstructing the decoded frame includes:

identifying a joint deblocking threshold index from a plurality of deblocking threshold indexes for deblocking the decoded frame wherein the joint deblocking threshold index identifies a first defined set of deblocking thresholds;

identifying a first deblocking threshold index from the plurality of deblocking threshold indexes, wherein identifying the first deblocking threshold index includes using the joint deblocking threshold index as a second deblocking threshold index for deblocking the decoded frame, wherein the first deblocking threshold index identifies a second defined set of deblocking thresholds; and identifying the second deblocking threshold index from the plurality of deblocking threshold indexes, wherein identifying the second deblocking threshold index includes using the first deblocking threshold index for deblocking the decoded frame, wherein the second deblocking threshold index identifies a third defined set of deblocking threshold's, wherein:

generating the reconstructed frame includes:

generating a decoded block by decoding an encoded block from the encoded frame;

generating a reconstructed block based on the decoded block, wherein generating the reconstructed block includes deblocking based on the first deblocking threshold index and the second deblocking threshold index; and including the reconstructed block in the reconstructed frame; and wherein encoding includes:

on a condition that the first deblocking threshold index is a vertical deblocking threshold index, deblocking includes vertical deblocking based on the first deblocking threshold index and horizontal deblocking based on the second deblocking threshold index; and on a condition that the first deblocking threshold index is a horizontal deblocking threshold index, deblocking includes horizontal deblocking based on the first deblocking threshold index and vertical deblocking based on the second deblocking threshold index; and generating an output bitstream including the encoded frame, an indication of the first deblocking threshold index, and an indication of the second deblocking threshold index; and wherein the processor is configured to output the output bitstream.

10. The apparatus of claim 9, wherein the processor is configured to generate the output bitstream by:

including the first deblocking threshold index in a frame header corresponding to the encoded frame.

11. The apparatus of claim 9, wherein the processor is configured to generate the output bitstream by:

identifying a difference between the first deblocking threshold index and the second deblocking threshold index as a differential deblocking threshold index value, wherein identifying the difference includes subtracting the second deblocking threshold index from the first deblocking threshold index; and including the differential deblocking threshold index value in the output bitstream.

12. The apparatus of claim 9, wherein the processor is configured to identify the joint deblocking threshold index by:

determining joint error metrics, wherein each joint error metric from the joint error metrics corresponds with deblocking the decoded frame using a respective deblocking threshold index from the plurality of deblocking threshold indexes as the first deblocking threshold index and the second deblocking threshold index; and identifying the deblocking threshold index corresponding to a minimal joint error metric from the joint error metrics as the joint deblocking threshold index.

13. The apparatus of claim 12, wherein the processor is configured to identify the first deblocking threshold index by:

identifying first error metrics, wherein each first error metric from the first error metrics corresponds with deblocking the decoded frame using the joint deblocking threshold index as the second deblocking threshold index and using a respective deblocking threshold index from the plurality of deblocking threshold indexes, other than the joint deblocking threshold index, as the first deblocking threshold index;

including the minimal joint error metric in the first error metrics as a first error metric corresponding to the joint deblocking threshold index; and identifying the deblocking threshold index corresponding to a minimal first error metric from the first error metrics as the first deblocking threshold index.

14. The apparatus of claim 13, wherein the processor is configured to identify the second deblocking threshold index by:

identifying second error metrics, wherein each second error metric from the second error metrics corresponds with deblocking the decoded frame using the first deblocking threshold index and using a respective deblocking threshold index from the plurality of deblocking threshold indexes, other than the first deblocking threshold index, as the second deblocking threshold index;

including the minimal first error metric in the second error metrics as a second error metric corresponding to the first deblocking threshold index; and identifying the deblocking threshold index corresponding to a minimal second error metric from the second error metrics as the second deblocking threshold index.

15. The apparatus of claim 14, wherein deblocking includes:

identifying a current deblocking threshold based on a current deblocking threshold index, wherein:

on a condition that the current deblocking threshold index is the first deblocking threshold index, the current deblocking threshold is a first deblocking threshold from the second defined set of deblocking thresholds; and on a condition that the current deblocking threshold index is the second deblocking threshold index, the current deblocking threshold is a second deblocking threshold from the third defined set of deblocking thresholds.

16. The apparatus of claim 15, wherein the processor is configured to identify the current deblocking threshold by:

identifying a current set of deblocking thresholds from a plurality of deblocking thresholds based on the current deblocking threshold index, wherein:

on a condition that the current deblocking threshold index is the first deblocking threshold index, the current set of deblocking thresholds is the second defined set of deblocking thresholds; and on a condition that the current deblocking threshold index is the second deblocking threshold index, the current set of deblocking thresholds is the third defined set of deblocking thresholds;

identifying a current minimum transform block size corresponding to a current block boundary of the decoded block in a current direction; and identifying a subset of deblocking thresholds from the current set of deblocking thresholds based on the current minimum transform block size as the current deblocking threshold.

17. The apparatus of claim 16, wherein the processor is configured to identify the current deblocking threshold by:

in response to a determination that the current minimum transform block size differs from a second minimum transform block size for a second block boundary of the decoded block opposite the current block boundary, identifying the current deblocking threshold such that the current deblocking threshold differs from a deblocking threshold for the second block boundary; and in response to a determination that the current minimum transform block size is equivalent to the second minimum transform block size, identifying the deblocking threshold for the second block boundary as the current deblocking threshold.

18. The apparatus of claim 16, wherein deblocking includes:

in response to a current deblocking determination indicating deblocking for the current block boundary, deblocking the current block boundary; and generating the current deblocking determination by:

identifying a current flatness factor based on pixel values from the decoded block along the current direction;

in response to a determination that the current flatness factor exceeds a deblocking determination threshold value from the current deblocking threshold, identifying the current deblocking determination as indicating an omission of deblocking;

identifying an adjacent flatness factor based on pixel values from an adjacent decoded block along the current direction;

in response to a determination that the adjacent flatness factor exceeds the deblocking determination threshold value, identifying the current blocking determination as indicating the omission of deblocking; and in response to a determination that the current flatness factor is within the deblocking determination threshold value and the adjacent flatness factor is within the deblocking determination threshold value, identifying the current blocking determination as indicating deblocking.

19. Me apparatus of claim 16, wherein deblocking includes;

in response to a current deblocking determination indicating deblocking for the current block boundary, deblocking the current block boundary, wherein deblocking the current block boundary includes:

identifying a deblocking filter threshold from the subset of deblocking thresholds;

identifying a deblocking filter parameter based on the deblocking filter threshold; and deblocking the current block boundary using the deblocking filter parameter.

20. An apparatus comprising:

a processor configured to generate a reconstructed frame by:

generating a decoded frame including decoded blocks by decoding a portion of an encoded bitstream;

reading a first deblocking threshold index from the encoded bitstream, wherein the first deblocking threshold index identifies a first defined set of deblocking thresholds, wherein reading the first deblocking threshold index includes extracting the first deblocking threshold index from a frame header corresponding to the reconstructed frame;

identifying a second deblocking threshold index from the encoded bitstream, the second deblocking threshold index differing from the first deblocking threshold index, wherein identifying the second deblocking threshold index includes:

extracting information indicating the second deblocking threshold index from the frame header corresponding to the reconstructed frame;

in response to a determination that the information indicating the second deblocking threshold index includes a differential deblocking threshold index value, identifying a sum of the differential deblocking threshold index value and the first deblocking threshold index as the second deblocking threshold index; and in response to a determination that the information indicating the second deblocking threshold index includes a deblocking threshold index, identifying the deblocking threshold index as the second deblocking threshold index;

generating a partially deblocked frame by deblocking the decoded frame in a first direction based on the first deblocking threshold index; and generating the reconstructed frame by deblocking the partially deblocked frame in a second direction based on the second deblocking threshold index; and wherein the processor is configured to output the reconstructed frame.

* * * * *